(12) United States Patent
Takayama et al.

(10) Patent No.: US 7,724,951 B2
(45) Date of Patent: May 25, 2010

(54) SIGNAL PROCESSING METHOD, SIGNAL PROCESSING APPARATUS, AND IMAGE READING APPARATUS

(75) Inventors: Tsutomu Takayama, Kanagawa (JP); Mitsugu Hanabusa, Tokyo (JP); Atsuko Kashiwazaki, Kanagawa (JP); Kengo Kinumura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 525 days.

(21) Appl. No.: 11/733,098

(22) Filed: Apr. 9, 2007

(65) Prior Publication Data

US 2007/0189636 A1    Aug. 16, 2007

Related U.S. Application Data

(62) Division of application No. 09/883,467, filed on Jun. 14, 2001, now abandoned.

(30) Foreign Application Priority Data

| Jun. 19, 2000 | (JP) | ............................. 2000-182905 |
| Mar. 15, 2001 | (JP) | ............................. 2001-074738 |

(51) Int. Cl.
  *G06K 9/00* (2006.01)
  *G06K 9/40* (2006.01)
(52) U.S. Cl. ........................ 382/170; 382/172; 382/274
(58) Field of Classification Search ................ 382/112, 382/162–172, 270–275
See application file for complete search history.

(56) References Cited

U.S. PATENT DOCUMENTS

| 5,266,805 A | 11/1993 | Edgar ........................ 250/330 |
| 5,325,443 A | 6/1994 | Beatty et al. ................. 382/147 |
| 5,357,353 A | 10/1994 | Hirota ........................ 358/530 |
| 5,555,318 A | 9/1996 | Ito et al. ..................... 382/168 |
| 5,832,111 A | 11/1998 | Florent ........................ 382/171 |
| 5,949,905 A | 9/1999 | Nichani et al. ............... 382/173 |
| 6,064,494 A | 5/2000 | Hirota et al. ................. 358/1.9 |
| 6,078,051 A | 6/2000 | Banton et al. ............ 250/341.1 |

(Continued)

FOREIGN PATENT DOCUMENTS

JP    2000-101793    4/2000

(Continued)

OTHER PUBLICATIONS

English abstract for Japanese Publication No. 2000-115464.

(Continued)

*Primary Examiner*—Wesley Tucker
(74) *Attorney, Agent, or Firm*—Fitzpatrick, Cella, Harper & Scinto

(57) ABSTRACT

Upon processing a visible light image signal and infrared image signal respectively obtained by illuminating a transparent document with light beams coming from a visible light lamp for mainly emitting visible light and an infrared lamp for mainly emitting infrared light, and photoelectrically converting optical images of the transparent document, a histogram is generated on the basis of the infrared image signal, a threshold value is calculated based on the histogram, and infrared image signal components equal to or smaller than the threshold value are extracted by comparing the calculated threshold value and infrared image signal components. Visible light image signal components corresponding to the extracted infrared image signal components are interpolated using surrounding visible light image signal components.

9 Claims, 34 Drawing Sheets

U.S. PATENT DOCUMENTS

| | | | |
|---|---|---|---|
| 6,222,642 B1 | 4/2001 | Farrell et al. .................. | 358/1.9 |
| 6,341,172 B1 | 1/2002 | Xu et al. ..................... | 382/132 |
| 6,633,415 B1 | 10/2003 | Arafune et al. .............. | 358/474 |
| 6,707,557 B2 | 3/2004 | Young, Jr. et al. ........... | 356/444 |
| 6,832,008 B1 | 12/2004 | Wada ......................... | 382/275 |
| 2003/0128889 A1 | 7/2003 | Maeda et al. ............... | 382/275 |

FOREIGN PATENT DOCUMENTS

| | | |
|---|---|---|
| JP | 2000-115464 | 4/2000 |
| JP | 2000-115465 | 4/2000 |
| JP | 2000-349976 | 12/2000 |

OTHER PUBLICATIONS

English abstract for Japanese Publication No. 2000-115465.
English abstract for Japanese Publication No. 2000-101793.
English abstract for Japanese Publication No. 2000-349976.

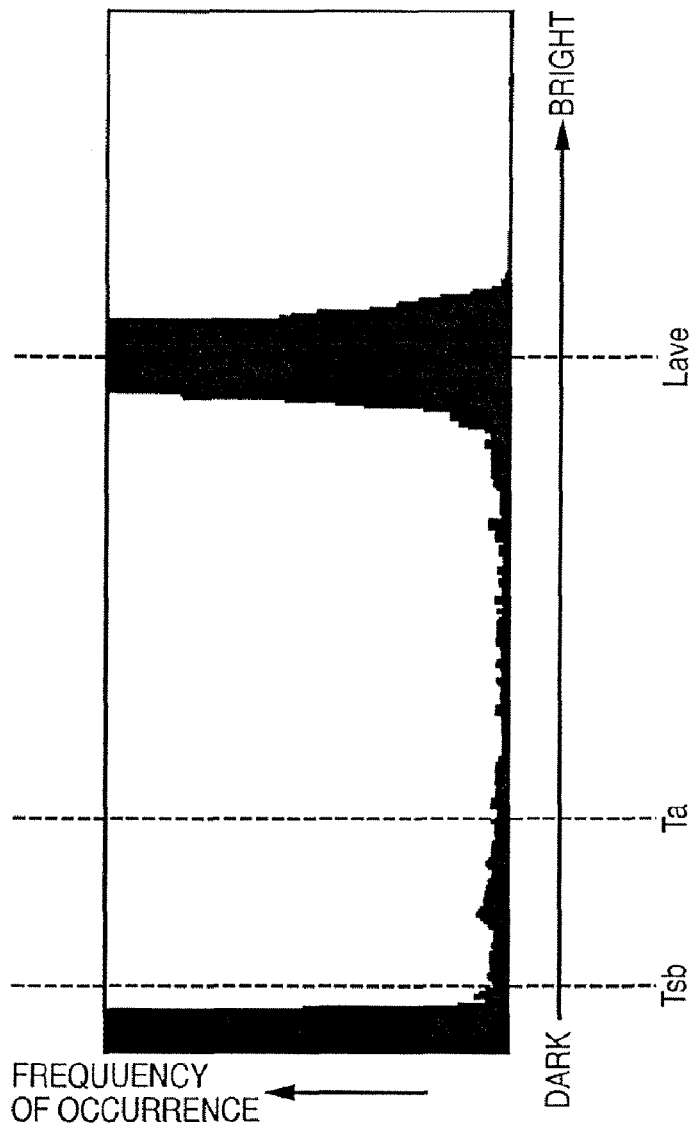
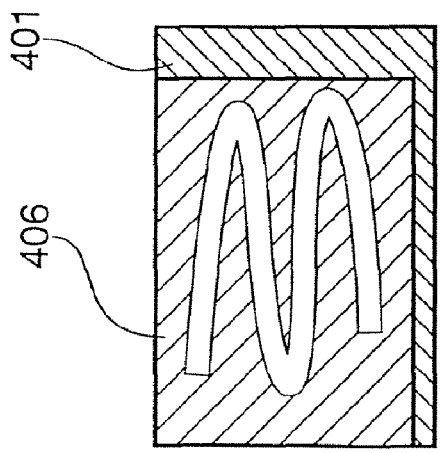

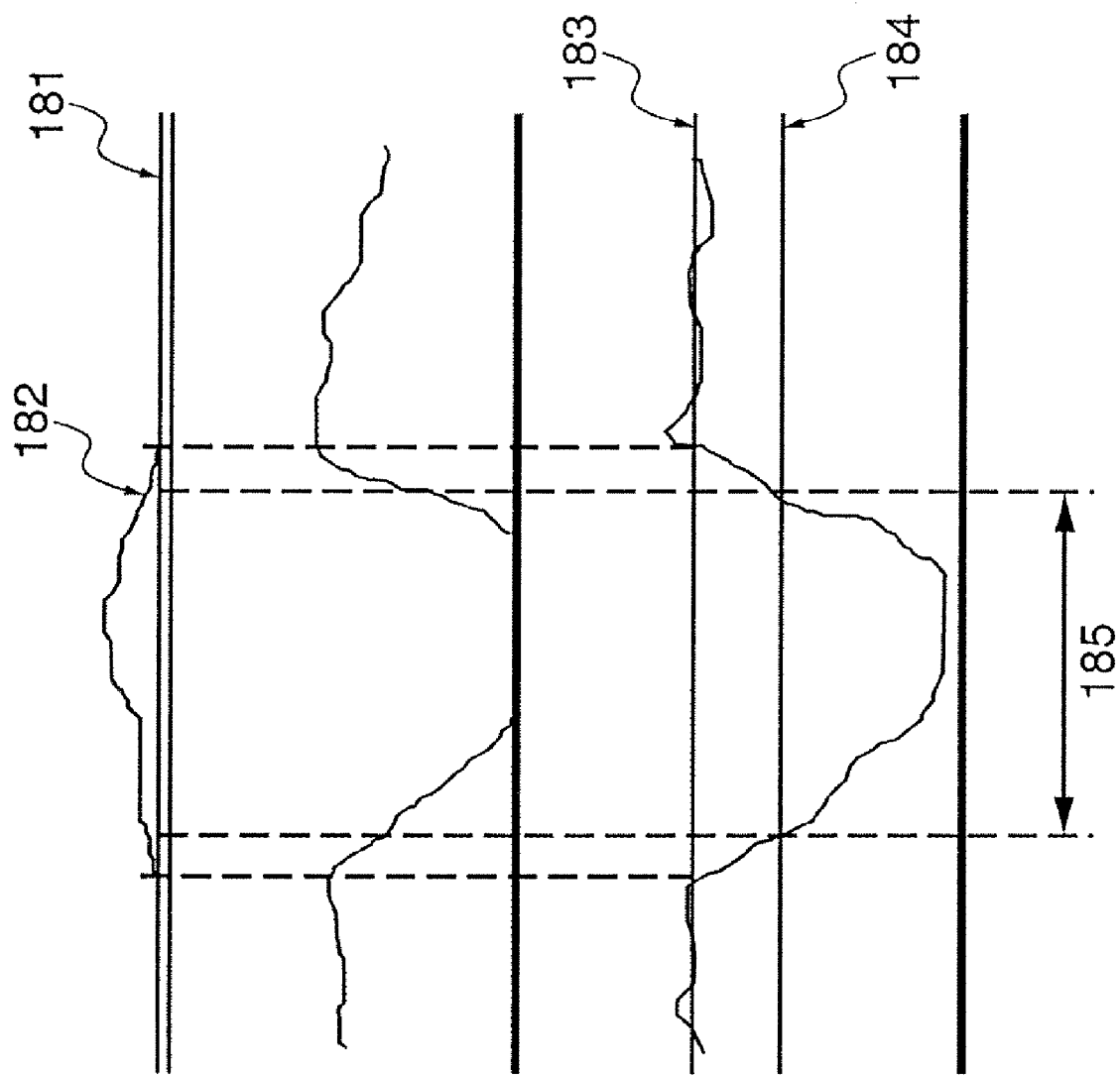

SIGNAL PROCESSING METHOD, SIGNAL PROCESSING APPARATUS, AND IMAGE READING APPARATUS

This application is a divisional application of U.S. patent application Ser. No. 09/883,467, which was filed Jun. 14, 2001, now abandoned to which priority under 35 U.S.C. §120 is claimed.

FIELD OF THE INVENTION

The present invention relates to a signal processing method, signal processing apparatus, and image reading apparatus and, more particularly, to a signal processing method, signal processing apparatus, and image reading apparatus for correcting any defects formed on a transparent document by dust, scratches, and the like.

BACKGROUND OF THE INVENTION

FIG. 28 shows a schematic arrangement in a conventional transparent document image reading apparatus. Referring to FIG. 28, a transparent document 142 such as a positive film, negative film, or the like placed on a platen glass 141 is illuminated with light emitted by a transparent document illumination lamp 144 via a diffusion plate 143 set above the document, and light transmitted through the transparent document 142 is guided to a CCD 150 via a mirror 147, inverted-V mirrors 148, and imaging lens 149. The light is converted by the CCD 150 on which a large number of solid-state image sensing elements line up into an electrical signal, thus obtaining an image signal in the main scan direction.

In this case, image reading in the sub-scan direction is done by mechanically moving the transparent document illumination lamp 144 and mirror 147 in the sub-scan direction with respect to the transparent document 142 while maintaining an identical velocity and phase, and making the inverted-V mirrors 148 track at the half scan velocity in the sub-scan direction so as to maintain a constant optical path length (conjugate relationship) from the transparent document 142 to the CCD 150. In this way, a two-dimensional image is read in combination with the process in the main scan direction.

The aforementioned transparent document image reading apparatus can read a so-called reflecting document which is described on an opaque material and is illuminated with light so as to process the light reflected by the material. In this case, a reflecting document is placed in place of the transparent document 142, and is illuminated with a direct light beam emitted by a reflecting document illumination lamp 145, which is turned on in place of the transparent document illumination lamp 144, and with a light beam reflected by a reflector 146. The light reflected by the reflecting document is read by the CCD 150, thus forming an image in the main scan direction as in the transparent document.

Especially, as a color reading method, a 3-line color image reading method is prevalent. That is, the reflecting document illumination lamp 145 uses a lamp having white spectral characteristics, and the CCD 150 uses a 3-line type CCD having R, G, and B color filters. Three colors (R, G, and B) of image information are simultaneously read by a single scan, and R, G, and B color signals on an identical line are superposed by an image processing circuit, thus forming a color image.

In order to correct any defects on an image due to dust, scratches, and the like on a transparent document in the aforementioned transparent document image reading apparatus, the only effective method is to retouch them using image edit software after the image is read. For this reason, a very long time is required to correct such defects.

In recent years, as such transparent document image reading apparatus, an image reading apparatus having a so-called dust/scratch removal function of detecting dust present on a transparent document and scratches on a film surface (such detection will be referred to as "dust/scratch detection" hereinafter), and removing the influences of such dust and scratches by an image process has been developed.

FIG. 29 shows a conventional image reading apparatus 1 having a dust/scratch detection function. The same reference numerals in FIG. 29 denote the same parts as in FIG. 28, and a detailed description thereof will be omitted.

Referring to FIG. 29, reference numeral 151 denotes an infrared lamp which comprises an LED having an emission intensity peak at a wavelength of about 880 nm.

FIG. 30 is a block diagram showing the functional arrangement of a dust/scratch remover 2 for implementing dust/scratch removal using image data obtained by the image reading apparatus 1. Referring to FIG. 30, reference numeral 21 denotes an interface (I/F) for inputting image data read by the image reading apparatus 1; 22, an image memory for storing an image read using the transparent document illumination lamp 144 or reflecting document illumination lamp 145 (to be referred to as a "normal image" hereinafter); 23, an infrared image memory for storing an image read using the infrared lamp 151 (to be referred to as an "infrared image" hereinafter); 24, a threshold value holding unit for holding a predetermined threshold value; 25, a dust/scratch detection unit; and 26, a dust/scratch correction unit.

FIG. 31 shows the spectral intensity distributions of the transparent document illumination lamp 144 and infrared lamp 151, and the characteristics of these lamps are represented by the solid and dot-dash-curves, respectively. FIG. 32 shows the spectral transmittance characteristics of cyan, yellow, and magenta dyes of a general negative/positive film, and the peak wavelength (about 880 nm) of the spectral intensity distribution of the infrared lamp 151. As is apparent from FIG. 32, most light components emitted by the infrared lamp are transmitted through a general color film irrespective of an image on the film since all dyes have very high transmittance at about 880 nm.

The transparent document reading operation including dust/scratch removal will be explained in detail below with reference to the flow chart shown in FIG. 33.

In step S10, the reflecting document illumination lamp 145 and infrared lamp 151 in FIG. 29 are turned off, and the transparent document illumination lamp 144 is turned on. At this time, an illumination light beam emitted by the transparent document illumination lamp 144 is uniformly diffused by the diffusion plate 143, and that diffused light beam is transmitted through the transparent document 142. The transmitted light beam passes through the mirror 147, inverted-V mirrors 148, and imaging lens 149, and is projected onto the CCD 150. An image projected onto the CCD 150 is converted into an electrical signal, which is temporarily stored in the image memory 22 via the I/F 21 in FIG. 30.

In step S20, the reflecting document illumination lamp 145 and transparent document illumination lamp 144 in FIG. 29 are turned off, and the infrared lamp 151 is turned on. An illumination light beam emitted by the infrared lamp 151 with the characteristics shown in FIG. 31 is uniformly diffused by the diffusion plate 143. The diffused light beam is transmitted through the transparent document 142, and passes through the mirror 147, inverted-V mirrors 148, and imaging lens 149. The light is then projected onto the CCD 150. Hence, the illumination light beam emitted by the infrared lamp 151 is transmitted through the transparent document 142 irrespective of an image (exposure) of the transparent document 142 such as a negative film, positive film, or the like, as shown in FIG. 32, and an image of dust, scratch, or like, which physically intercepts the optical path, is projected onto the CCD 150 as a shadow. The infrared image projected onto the CCD 150 is converted into the electrical signal, which is temporarily stored in the infrared image memory 23 via the I/F 21 in FIG. 30.

In step S30 and subsequent steps, dust/scratch detection and correction are executed. The principle of dust/scratch detection will be described in detail below.

FIGS. 34A to 34C illustrate the relationship between dust or the like, and the gray levels of images read using the transparent document illumination lamp 144 and infrared lamp 151, which are plotted in the main scan direction. In FIG. 34A, reference numeral 181 denotes a positive film; and 182, dust on the positive film 181. FIG. 34B shows the gray level obtained when a corresponding portion in FIG. 34A is read using the transparent document illumination lamp 144. The gray level assumes a lower value as an image becomes darker. The gray level of the dust portion 182 is low irrespective of an image on the positive film. FIG. 34C shows the gray level obtained when the portion in FIG. 34A is read using the infrared lamp 151. The dust portion 182 has low gray level since no infrared light is transmitted through there, and a portion other than the dust 182 has a nearly constant level 183 since infrared light is transmitted through there. Hence, a threshold value 184 is set at a gray level lower than the level 183, and a defect region 185 formed by dust can be detected by extracting a portion having a gray level equal to or lower than the threshold value 184.

The threshold value 184 is held in advance in the threshold value holding unit 24. Therefore, the dust/scratch detection unit 25 reads out this threshold value 184 from the threshold value holding unit 24, and compares it with infrared image data in turn in step S30, thus detecting the defect region 185.

If the infrared image data is smaller than the threshold value 184 (NO in step S30), the influence of dust 182 is eliminated by executing, e.g., an interpolation process of the defect region 185 based on a normal region around it in step S40. The comparison process is executed for all infrared image data, and when any defect region is detected, the corresponding normal image data undergoes interpolation (step S50).

However, the aforementioned prior art cannot normally detect a defect portion or erroneously detect even a normal portion as a defect portion due to insufficient detection precision. That is, the nearly constant level 183 of infrared rays that have been transmitted through the transparent document largely varies due to light amount errors of the infrared lamp 151, transmission errors depending on the type of color film at the emission wavelength of 880 nm of the infrared lamp 151, and sensitivity errors of the CCD 150 at the emission wavelength of 880 nm. For this reason, if the threshold value 184 is set as a fixed value, the level 183 assumes a value higher than the threshold value 184, and even a normal image portion is detected as a defect portion, or the threshold value 184 defines a gray level much lower than the level 183, and a defect region cannot be accurately detected.

SUMMARY OF THE INVENTION

The present invention has been made in consideration of the above situation, and has as its object to stably implement appropriate dust/scratch detection irrespective of the characteristics of the infrared lamp, the type of color film, and the sensitivity characteristics of the photoelectric conversion element, when a transparent document is read and a dust/scratch portion is corrected.

According to the present invention, the foregoing object is attained by providing a signal processing method for processing a visible light image signal and infrared image signal obtained by illuminating a transparent document with light beams respectively coming from a visible light source for mainly emitting visible light and an infrared light source for mainly emitting infrared light, and photoelectrically converting optical images of the transparent document, comprising a generation step of generating a histogram on the basis of the infrared image signal, a calculation step of calculating a threshold value on the basis of the histogram generated in the generation step, an extraction step of comparing the threshold value calculated in the calculation step with infrared image signal components, and extracting infrared image signal components not more than the threshold value, and an interpolation step of executing an interpolation process of the visible light image signal on the basis of the infrared image signal components extracted in the extraction step.

According to the present invention, the foregoing object is also attained by providing a signal processing apparatus for processing a visible light image signal and infrared image signal obtained by illuminating a transparent document with light beams respectively coming from a visible light source for mainly emitting visible light and an infrared light source for mainly emitting infrared light, and photoelectrically converting optical images of the transparent document, comprising generation means for generating a histogram on the basis of the infrared image signal, calculation means for calculating a threshold value on the basis of the histogram generated by the generation means, extraction means for comparing the threshold value calculated by the calculation means with infrared image signal components, and extracting infrared image signal components not more than the threshold value, and interpolation means for executing an interpolation process of the visible light image signal on the basis of the infrared image signal components extracted by the extraction means.

Further, the foregoing object is also attained by providing an image reading apparatus capable of reading a transparent document, comprising a visible light source for mainly emitting visible light, an infrared light source for mainly emitting infrared light, a photoelectric converter for converting an optical image into an electrical signal, generation means for generating a histogram on the basis of an infrared image signal obtained via the photoelectric converter by illuminating a transparent document with light emitted by the infrared light source, calculation means for calculating a threshold value on the basis of the histogram generated by the generation means, extraction means for comparing the threshold value calculated by the calculation means with infrared image signal components, and extracting infrared image signal components not more than the threshold value, and interpolation means for executing an interpolation process of a visible light image signal, obtained via the photoelectric converter by illuminating the transparent document with light emitted by the visible light source, on the basis of the infrared image signal components extracted by the extraction means.

Other features and advantages of the present invention will be apparent from the following description taken in conjunc-

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 19A and 19B show a read region that includes the film holder, and the histogram of an image obtained by reading that region using the infrared lamp;

FIGS. 34A to 34C show the relationship between dust on a film and the gray levels obtained by reading a film using the transparent document illumination lamp and infrared lamp in the prior art.

DETAILED DESCRIPTION OF THE PREFERRED EMBODIMENTS

Preferred embodiments of the present invention will be described in detail in accordance with the accompanying drawings.

First Embodiment

The first embodiment will be explained below. Note that the arrangement of an image reading apparatus used in the first embodiment is the same as that shown in FIG. 29, and a description thereof will be omitted.

Figure 1:
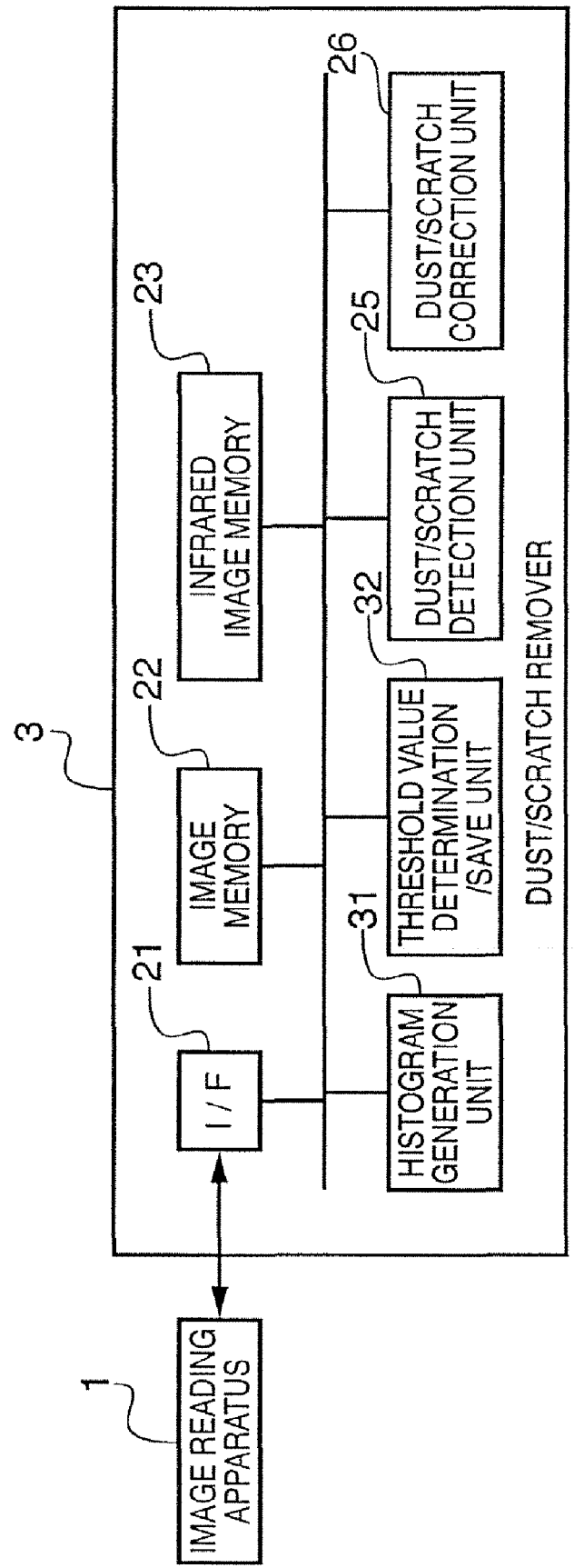
FIG. 1 is a block diagram showing an arrangement of an image reading system according to an embodiment of the present invention.

FIG. 1 is a block diagram showing the functional arrangement of a dust/scratch remover 3 that executes a dust/scratch removal process of an image signal output from the image reading apparatus 1 of the first embodiment. In FIG. 1, a dust/scratch remover 3 is illustrated as an apparatus independent from the image reading apparatus 1, but may be incorporated in the image reading apparatus 1.

Referring to FIG. 1, reference numeral 21 denotes an interface (I/F) for inputting image data read by the image reading apparatus 1; 22, an image memory for storing an image read using the transparent document illumination lamp 144 or reflecting document illumination lamp 145 (to be referred to as a "normal image" hereinafter); 23, an infrared image memory for storing an image read using the infrared lamp 151 (to be referred to as an "infrared image" hereinafter); 25, a dust/scratch detection unit; and 26, a dust/scratch correction unit. In the first embodiment, the dust/scratch remover 3 also has a histogram generation unit 31 and threshold value determination/save unit 32.

The transparent document reading operation upon executing dust/scratch removal in the first embodiment will be described in detail below with reference to the flow chart in FIG. 2.

Figure 29:
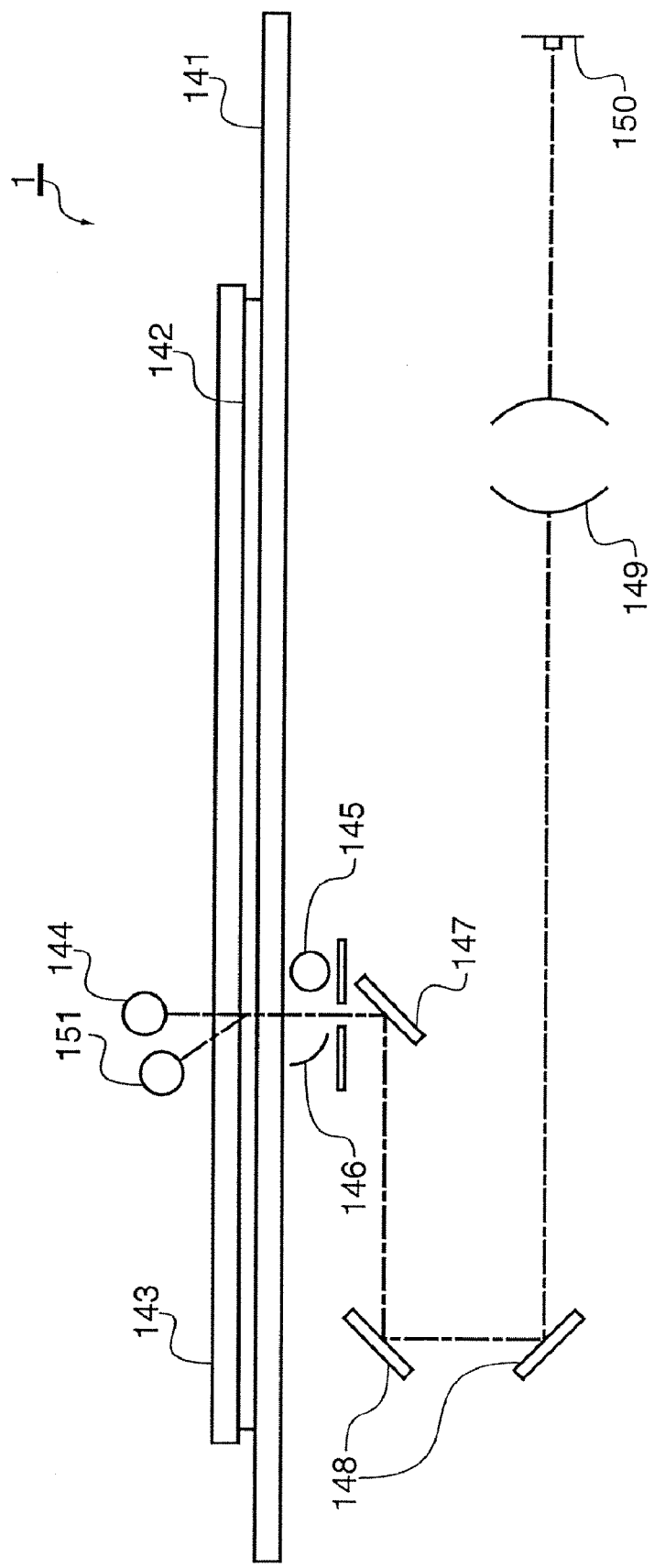
FIG. 29 is a schematic view showing the arrangement of a conventional image reading apparatus that detects a defect region formed by dust or scratch on a transparent document.
Figure 30:
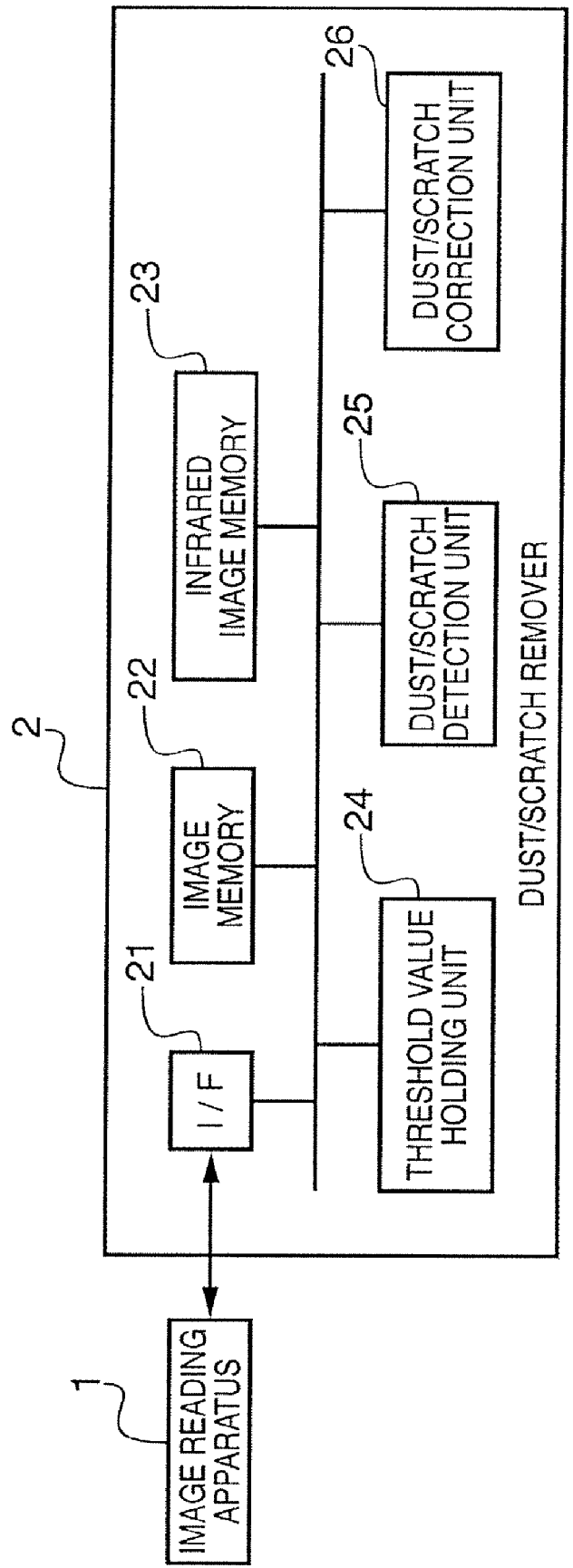
FIG. 30 is a block diagram showing the arrangement of a conventional image reading system.

In step S10, the reflecting document illumination lamp 145 and infrared lamp 151 in FIG. 29 are turned off, and the transparent document illumination lamp 144 is turned on. At this time, an illumination light beam emitted by the transparent document illumination lamp 144 is uniformly diffused by the diffusion plate 143, and that diffused light beam is transmitted through the transparent document 142. The transmitted light beam passes through the mirror 147, inverted-V mirrors 148, and imaging lens 149, and is projected onto the CCD 150. An image projected onto the CCD 150 is converted into an electrical signal, which is temporarily stored in the image memory 22 via the I/F 21 in FIG. 1.

Figure 31:
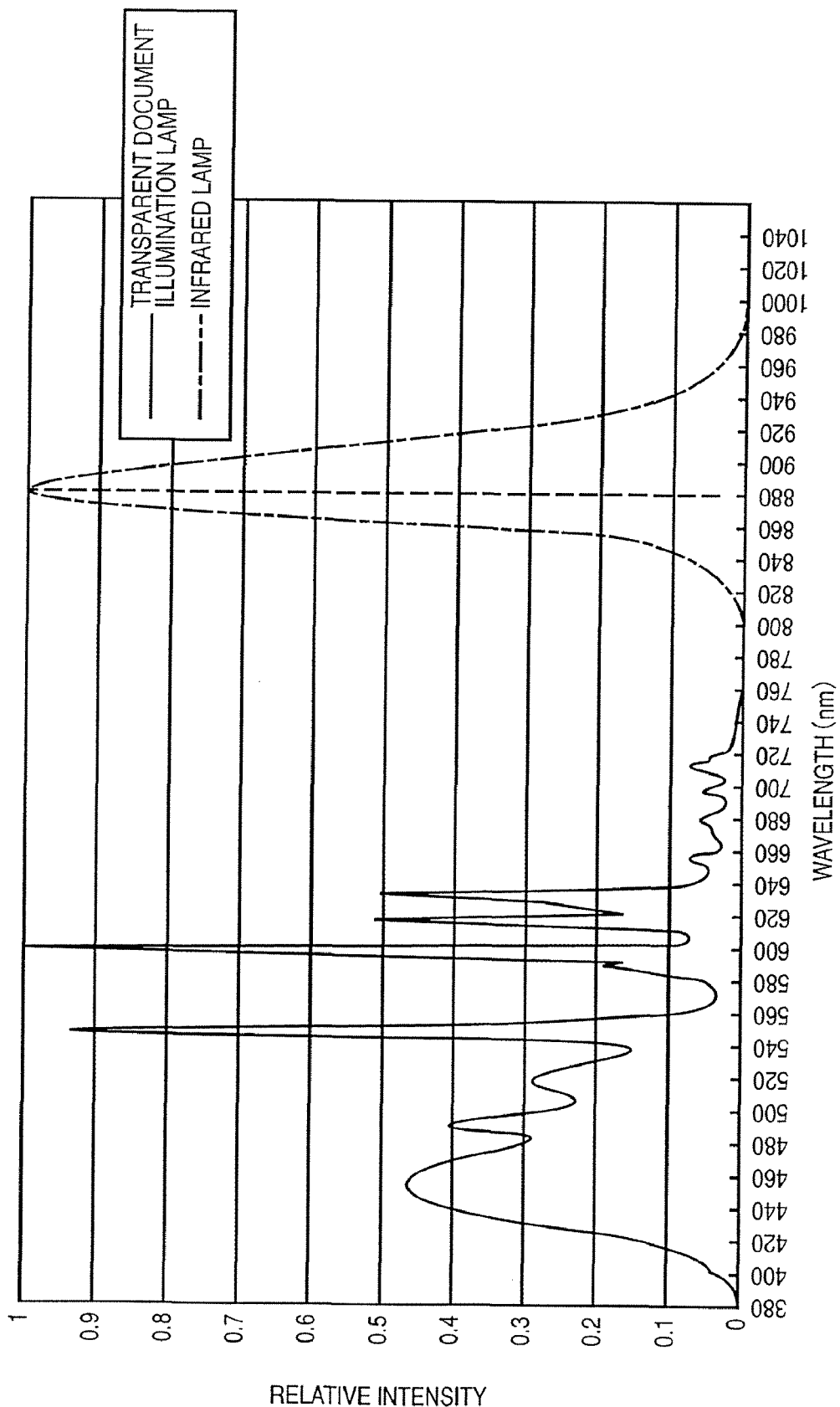
FIG. 31 is a graph showing the spectral intensity distributions of a transparent document illumination lamp and infrared lamp.
Figure 32:
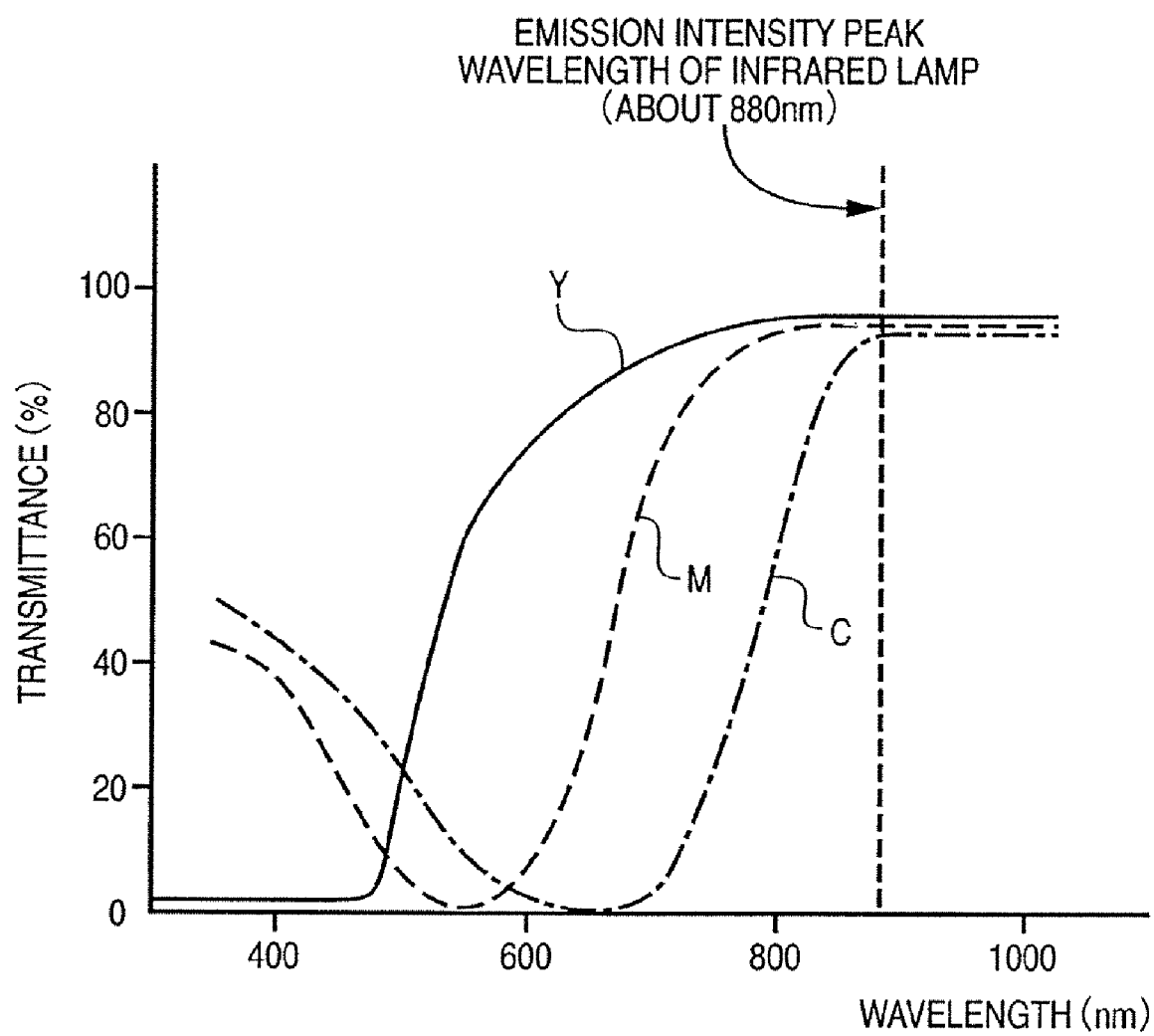
FIG. 32 is a graph showing the spectral transmittance characteristics of three different dyes in a general color film, and the peak wavelength of the spectral intensity distribution of an infrared lamp.
Figure 33:
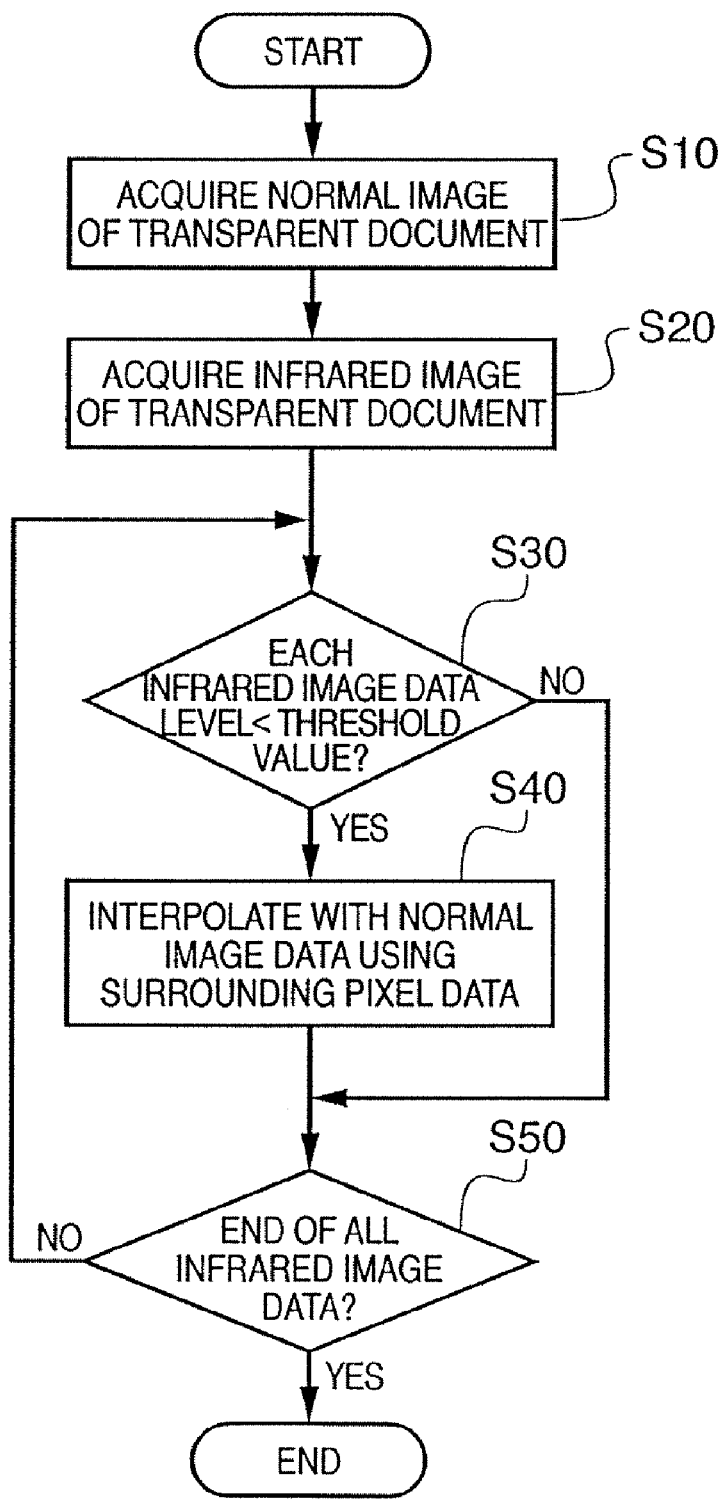
FIG. 33 is a flow chart showing a conventional process in a dust/scratch remover.

In step S20, the reflecting document illumination lamp 145 and transparent document illumination lamp 144 in FIG. 29 are turned off, and the infrared lamp 151 is turned on. An illumination light beam emitted by the infrared lamp 151 with the characteristics shown in FIG. 31 is uniformly diffused by the diffusion plate 143. The diffused light beam is transmitted through the transparent document 142, and passes through the mirror 147, inverted-V mirror 148, and imaging lens 149. The light is then projected onto the CCD 150. Hence, the illumination light beam emitted by the infrared lamp 151 is transmitted through the transparent document 142 irrespective of an image (exposure) of the transparent document 142 such as a negative film, positive film, or the like, as shown in FIG. 32, and an image of dust, scratch, or like, which physically intercepts the optical path, is projected onto the CCD 150 as a shadow. The infrared image projected onto the CCD 150 is converted into the electrical signal, which is temporarily stored in the infrared image memory 23 via the I/F 21 in FIG. 1.

Figure 3:
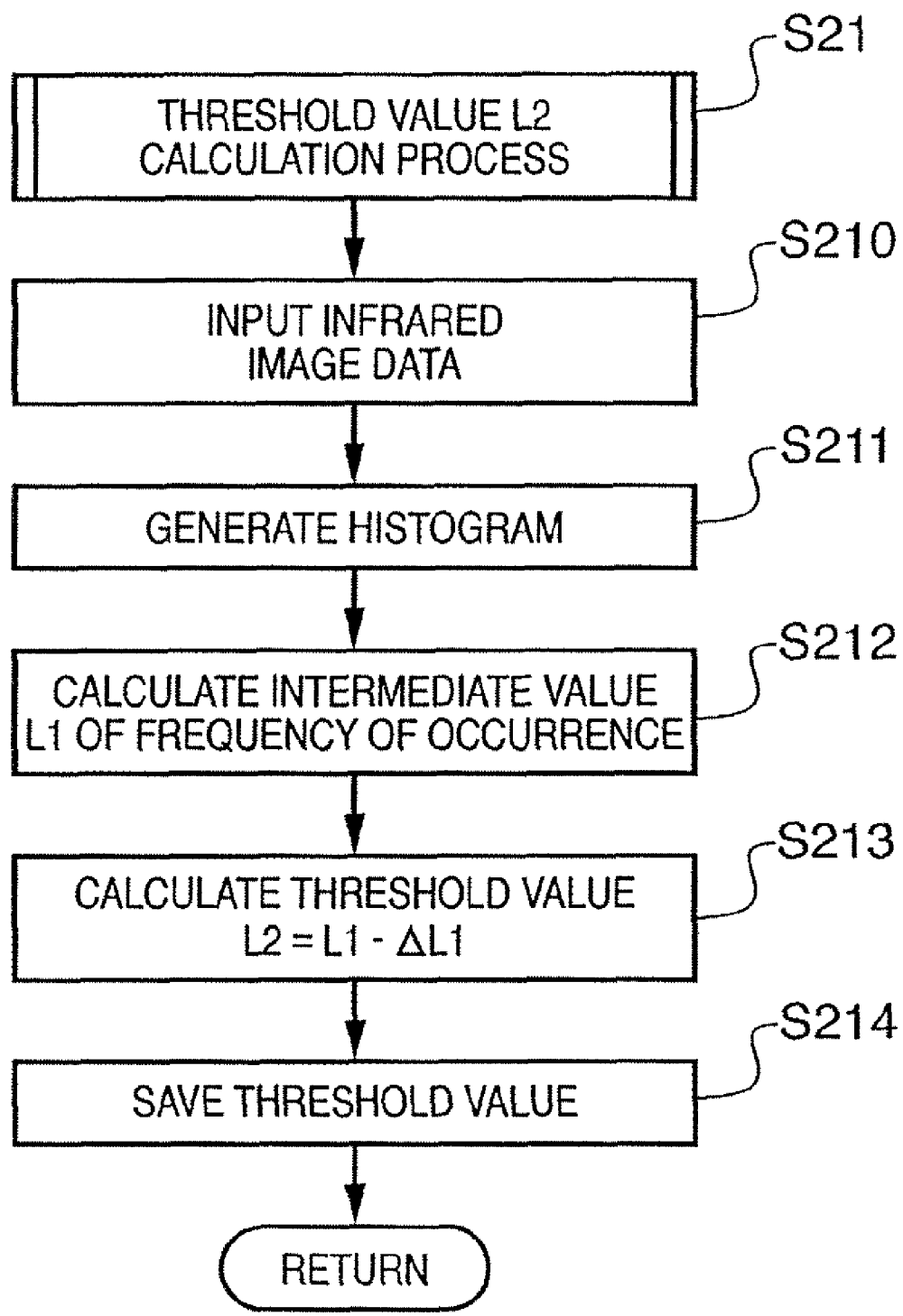
FIG. 3 is a flow chart showing a threshold value calculation process according to the first embodiment of the present invention.
Figure 4:
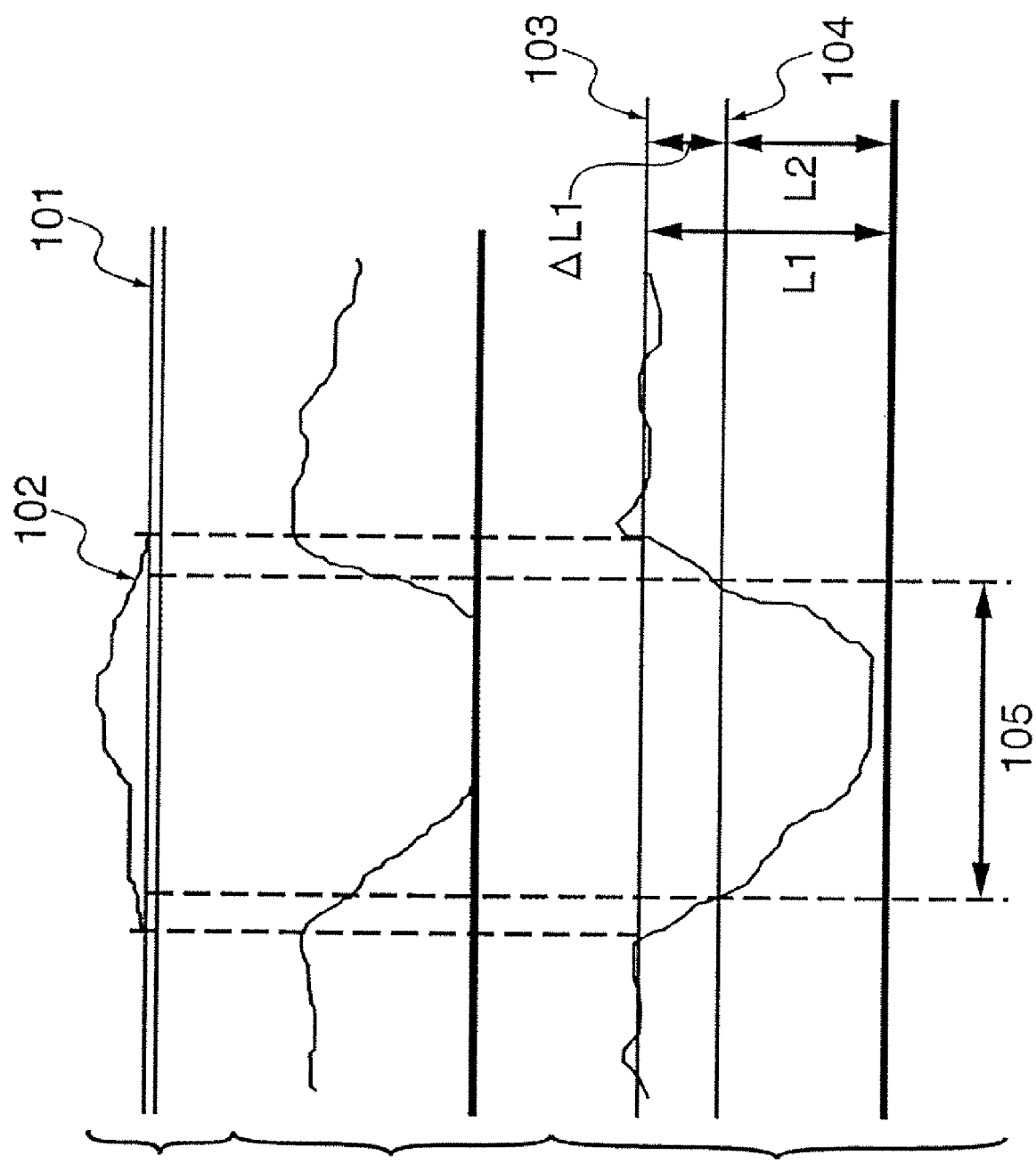
FIGS. 4A to 4C show the relationship between dust on a film, and the gray levels obtained by reading a film using a transparent document illumination lamp and infrared lamp according to the first embodiment of the present invention.

In the first embodiment, a threshold value L2 to be used in step S30 is calculated using the infrared image data temporarily stored in the infrared image memory 23 (step S21). The calculation method will be described in detail below with reference to FIGS. 3 to 5.

[in step S21. FIG. 4A shows a state wherein dust 102 is present on a positive film 101, FIG. 4B shows the gray level obtained when a portion in FIG. 4A is read using the transparent document illumination lamp 144 shown in FIG. 29, and FIG. 4C shows the gray level obtained when the portion in FIG. 4A is read using the infrared lamp 151 in FIG. 29.

The histogram generation unit 31 in FIG. 1 reads out infrared image data from the infrared image memory 23 in step S210, and generates a histogram of the numbers of times of occurrence of gray levels in step S211.

Figure 5:
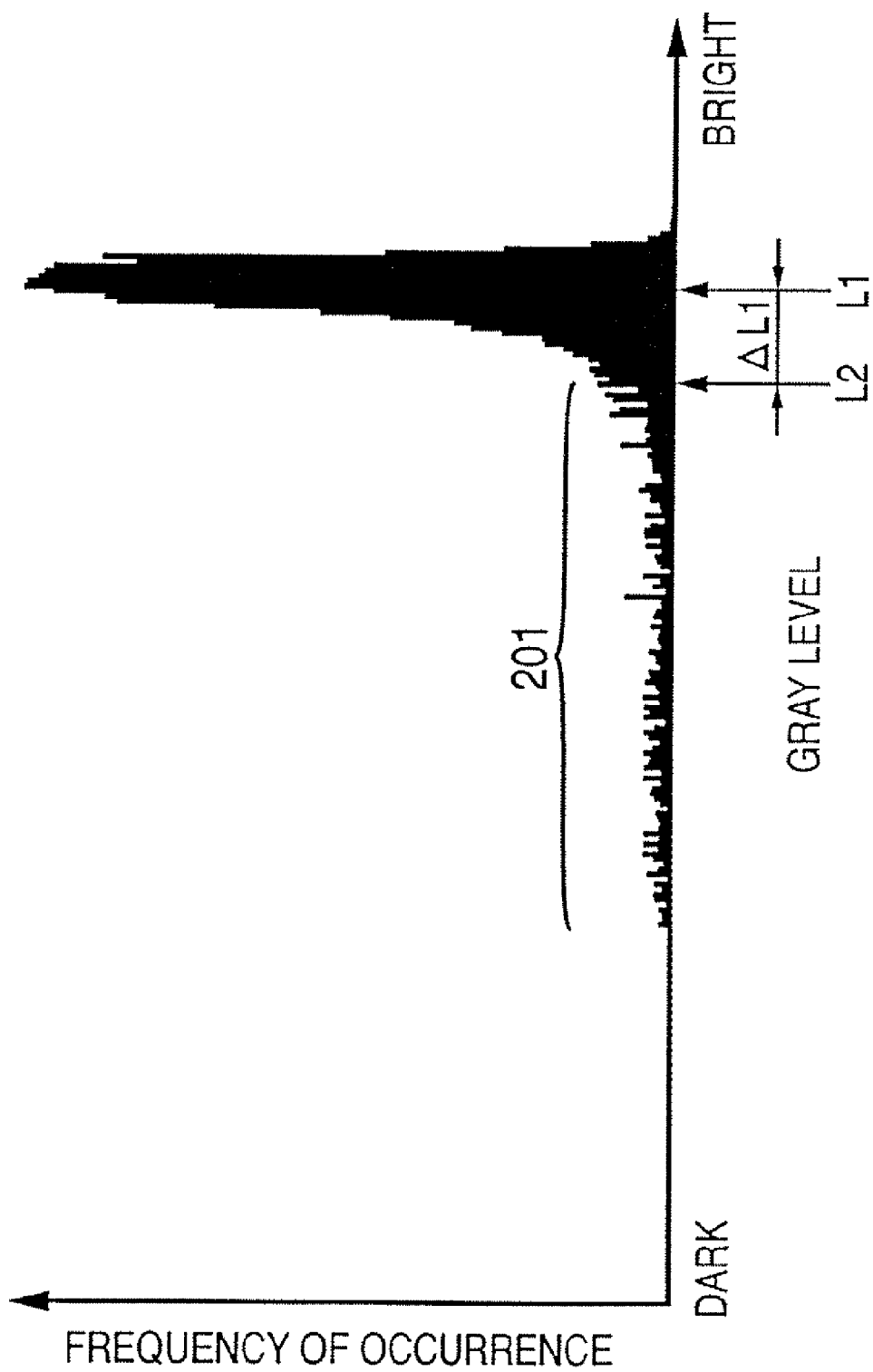
FIG. 5 shows a histogram of an image read using the infrared lamp according to the first embodiment of the present invention.

FIG. 5 shows an example of a histogram generated based on the gray levels of an infrared image read out from the infrared image memory 23. The ordinate plots the frequencies of occurrence for respective pixels, and the abscissa plots the gray level. That is, a higher numerical value indicates brighter image data.

In step S212, the threshold value determination/save unit 32 calculates an intermediate value of the frequencies of occurrence of the generated histogram to obtain a corresponding gray level L1. Note that the intermediate value of the frequencies of occurrence is a value obtained by equally dividing the total of the frequencies of occurrence, and L1 represents the gray level when the sum of the frequencies of occurrence in ascending or descending order of gray level exceeds the intermediate value of the frequencies of occurrence. In general, since the occupation ratio of dust 102 in the overall image is small, the gray level L1 corresponding to the intermediate value of the frequencies of occurrence nearly equals the intermediate value of the gray levels of an image other than the dust 102. The gray levels of the dust 102 have a distribution, as indicated by 201 in FIG. 5, and are lower than the gray level L1 corresponding to the intermediate value of the frequencies of occurrence.

Therefore, in the first embodiment the intermediate value of the frequencies of occurrence of histogram data is noted, and a threshold value for detecting dust 102 is set at a gray level L2 a predetermined level .DELTA.L1 lower than this gray level L1 so as to locate it near the maximum value of the gray level distribution 201 of dust 102 (step S213). Note that this predetermined level .DELTA.L1 may be pre-set and stored in the threshold value determination/save unit 32, or the generated histogram and gray level L1 may be displayed on a display, and the user may manually input .DELTA.L1.

Figure 2:
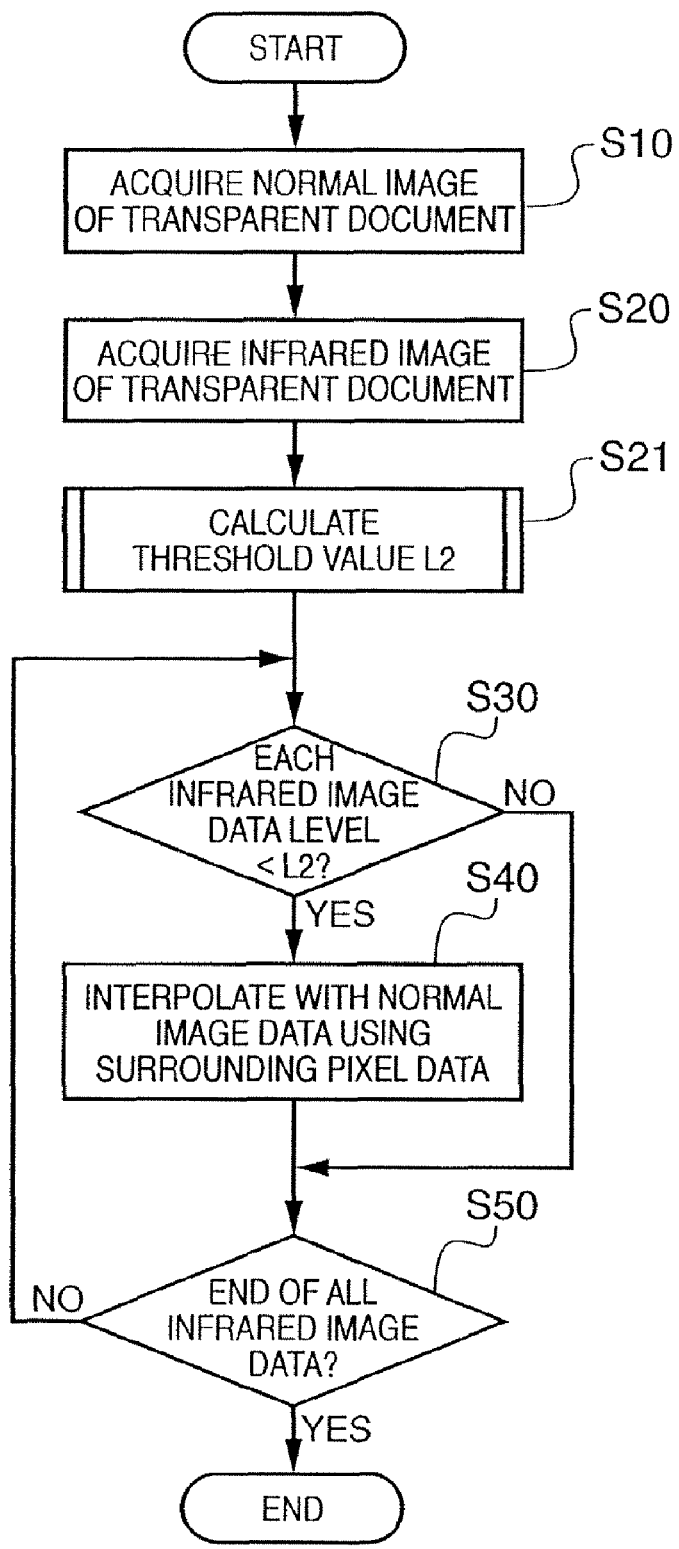
FIG. 2 is a flow chart showing a process in a dust/scratch remover according to the embodiment of the present invention.

The threshold value determination/save unit 32 saves the threshold value L2 determined in this way, and the flow advances to step S30 in FIG. 2. In step S30, the dust/scratch detection unit 25 reads out the threshold value L2 from the threshold value determination/save unit 32, reads out infrared image data from the infrared image memory 23, and sequentially compares the infrared image data with the threshold value L2, thus detecting a defect region 105.

If the infrared image data of interest is smaller than the threshold value L2 (YES in step S30), it is determined that the image data falls within the defective region 105 where data is absent due to dust 102, and the influence of dust 102 is eliminated by executing, e.g., an interpolation process of the defect region 105 based on a normal region around it (step S40). On the other hand, if the infrared image data of interest is equal to or larger than the threshold value L2 (NO in step S30), it is determined that the data falls within a region free from any influence of dust or the like. The comparison process is done for all infrared image data (step S50), and if any defect region 105 is detected, an interpolation process is executed.

As described above, according to the first embodiment, the dust 102 can be nearly accurately detected as the defect region 105 detected using a threshold value level 104, i.e., the threshold value L2.

Second Embodiment

The second embodiment will be described below.

In the first embodiment, a histogram of the frequencies of occurrence of gray levels is generated, and the threshold value L2 is obtained by subtracting the predetermined level .DELTA.L1 from the gray level L1 corresponding to the intermediate value of the frequencies of occurrence. However, in the second embodiment, the threshold value is determined using a gray level corresponding to the maximum frequency of occurrence. Since the operations are the same as those in the first embodiment except for the threshold value determination method, a description thereof will be omitted. The threshold value determination operation will be described below with reference to FIGS. 6A to 6C and FIG. 7. The same reference numerals in FIGS. 6A to 6C and FIG. 7 denote common ones to those in FIGS. 4A to 4C and FIG. 5, and a description thereof will be omitted.

Figure 6:
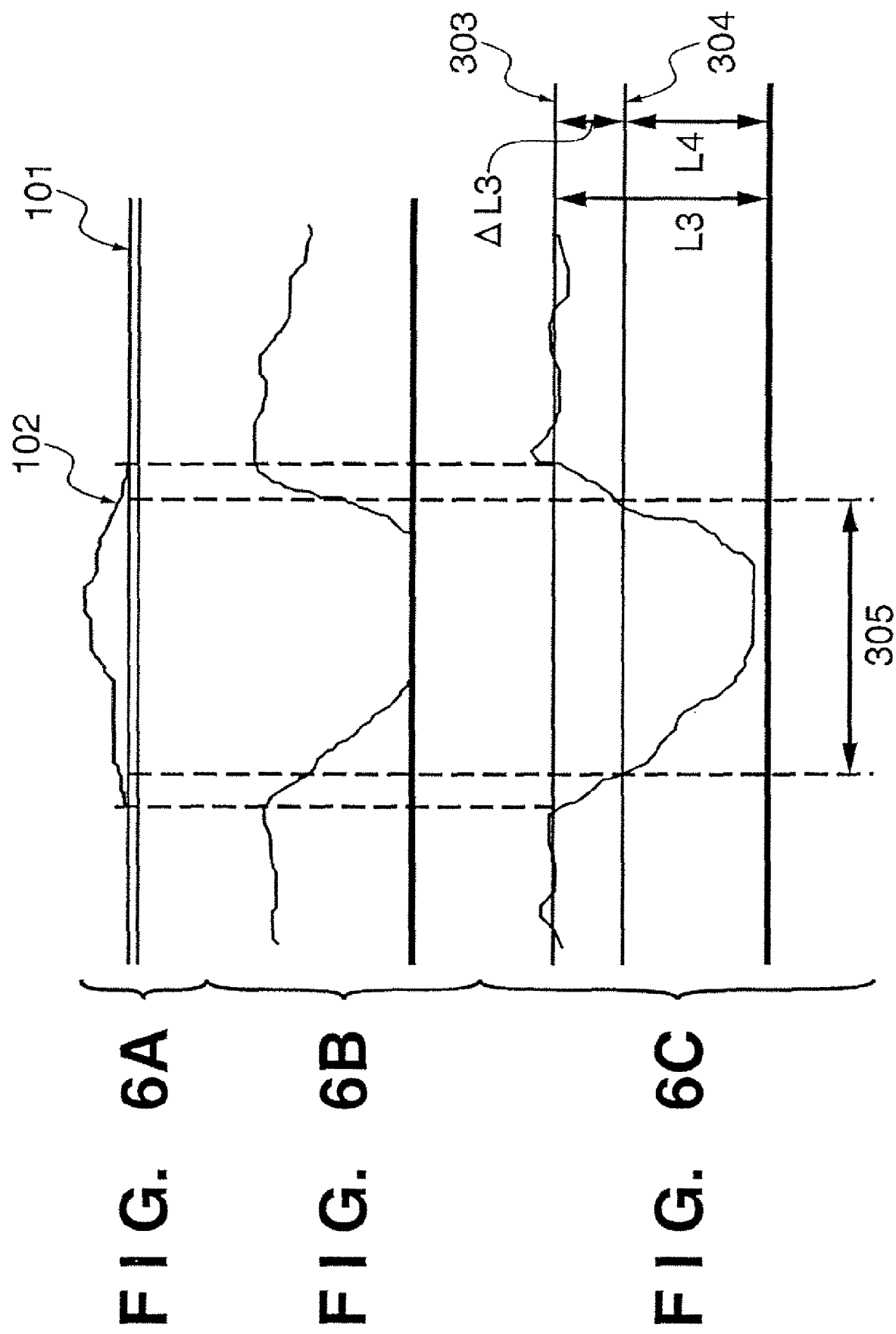
FIGS. 6A to 6C show the relationship between dust on a film, and the gray levels obtained by reading a film using a transparent document illumination lamp and infrared lamp according to the second embodiment of the present invention.

FIG. 6A shows a state wherein dust 102 is present on a positive film 101, FIG. 6B shows the gray level obtained when a portion in FIG. 6A is read using the transparent document illumination lamp 144 shown in FIG. 29, and FIG. 6C shows the gray level obtained when the portion in FIG. 6A is read using the infrared lamp 151 in FIG. 29.

Figure 7:
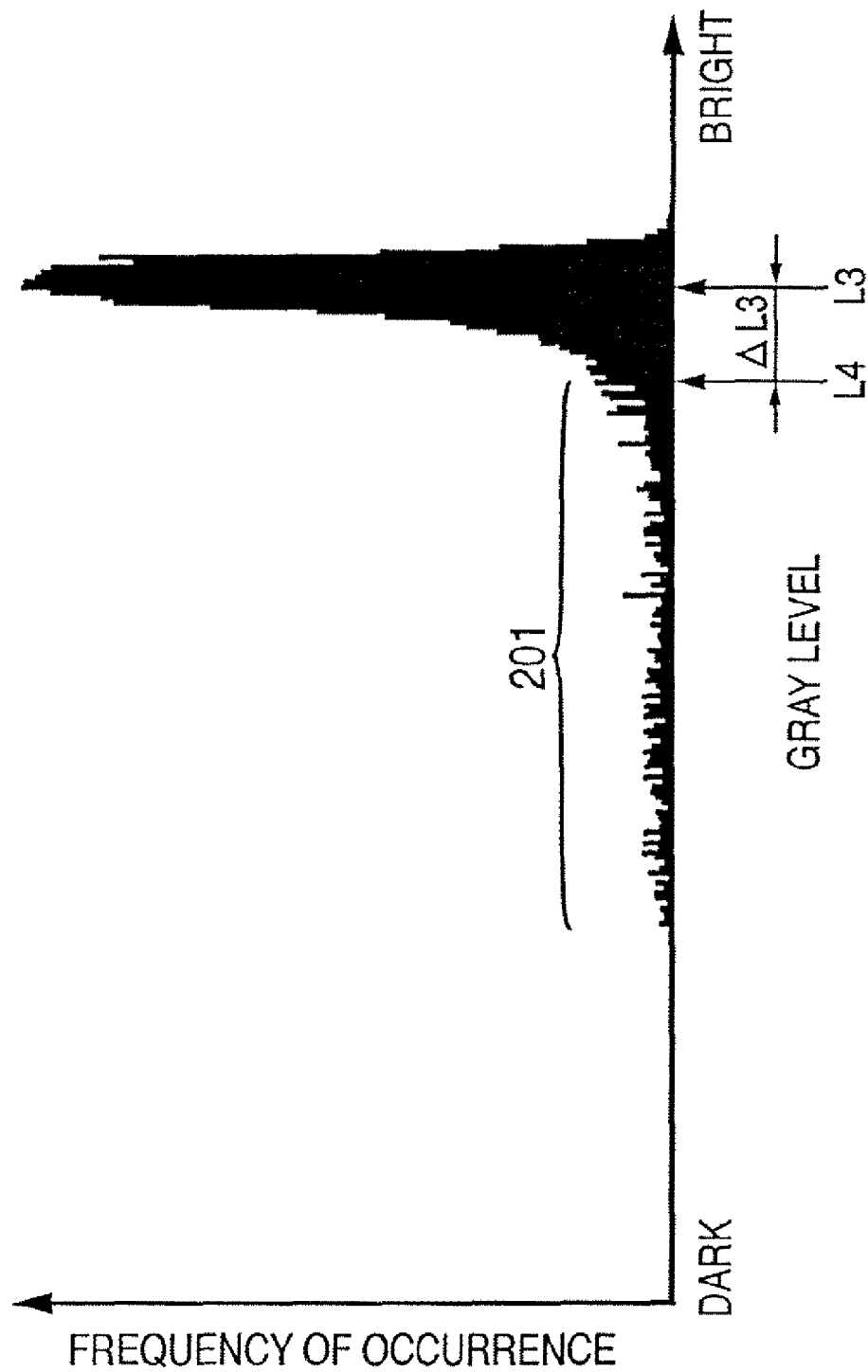
FIG. 7 shows a histogram of an image read using the infrared lamp according to the second embodiment of the present invention.

FIG. 7 shows an example of a histogram generated based on the gray levels of an infrared image read out from the infrared image memory 23 as in the first embodiment. The ordinate plots the frequencies of occurrence for respective pixels, and the abscissa plots the gray level.

The threshold value determination/save unit 32 obtains a gray level L3 corresponding to the maximum frequency of occurrence from the histogram generated. In the example shown in FIG. 7, the gray level corresponding to the maximum frequency of occurrence is L3, as also indicated by 303 in FIG. 6C. Since the occupation ratio of dust 102 in the overall image is small, the gray level L3 corresponding to the maximum frequency of occurrence nearly equals the average value of the gray levels of an image other than the dust 102. The gray levels of the dust 102 have a distribution, as indicated by 201 in FIG. 7, and are lower than the gray level L3 corresponding to the maximum frequency of occurrence.

Therefore, the second embodiment obtains the gray level L3 corresponding to the maximum frequency of occurrence of histogram data, and sets a threshold value used to detect dust 102 at a gray level L4 a predetermined level .DELTA.L3 lower than this gray level L3 to locate it near the maximum value of the gray level distribution 201 of dust 102. Note that this predetermined level .DELTA.L3 may be pre-set and stored in the threshold value determination/save unit 32, or the generated histogram and gray level L3 may be displayed on a display, and the user may manually input .DELTA.L3.

In the second embodiment, the threshold value L4 obtained in this way is used in place of the threshold value L2 in step S30 in FIG. 2.

As described above, according to the second embodiment, the dust 102 can be nearly accurately detected as a defect region 305 detected using a threshold value level 304, i.e., the threshold value L4.

Third Embodiment

The third embodiment will be described below.

The third embodiment is substantially the same as the first and second embodiments, except that the threshold value is determined using a maximum gray level. Since the operations are the same as those in the first or second embodiment except for the threshold value determination method, a description thereof will be omitted. The threshold value determination operation will be described below with reference to FIGS. 8A to 8C and FIG. 9. The same reference numerals in FIGS. 8A to 8C and FIG. 9 denote common ones to those in FIGS. 4A to 4C and FIG. 5, and a description thereof will be omitted.

Figure 8:
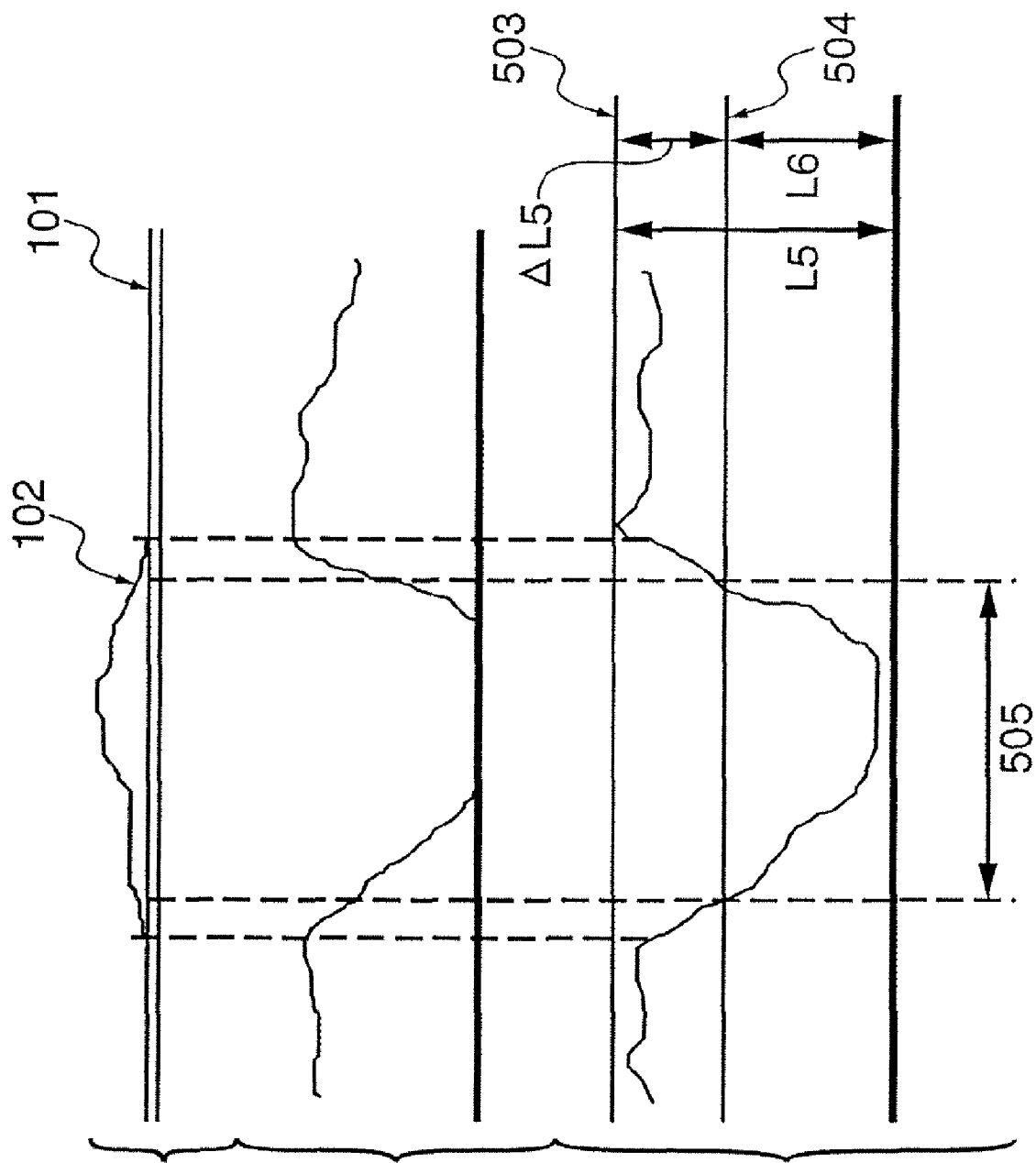
FIGS. 8A to 8C show the relationship between dust on a film, and the gray levels obtained by reading a film using a transparent document illumination lamp and infrared lamp according to the third embodiment of the present invention.

FIG. 8A shows a state wherein dust 102 is present on a positive film 101, FIG. 8B shows the gray level obtained when a portion in FIG. 8A is read using the transparent document illumination lamp 144 shown in FIG. 29, and FIG. 8C shows the gray level obtained when the portion in FIG. 8A is read using the infrared lamp 151 in FIG. 29.

Figure 9:
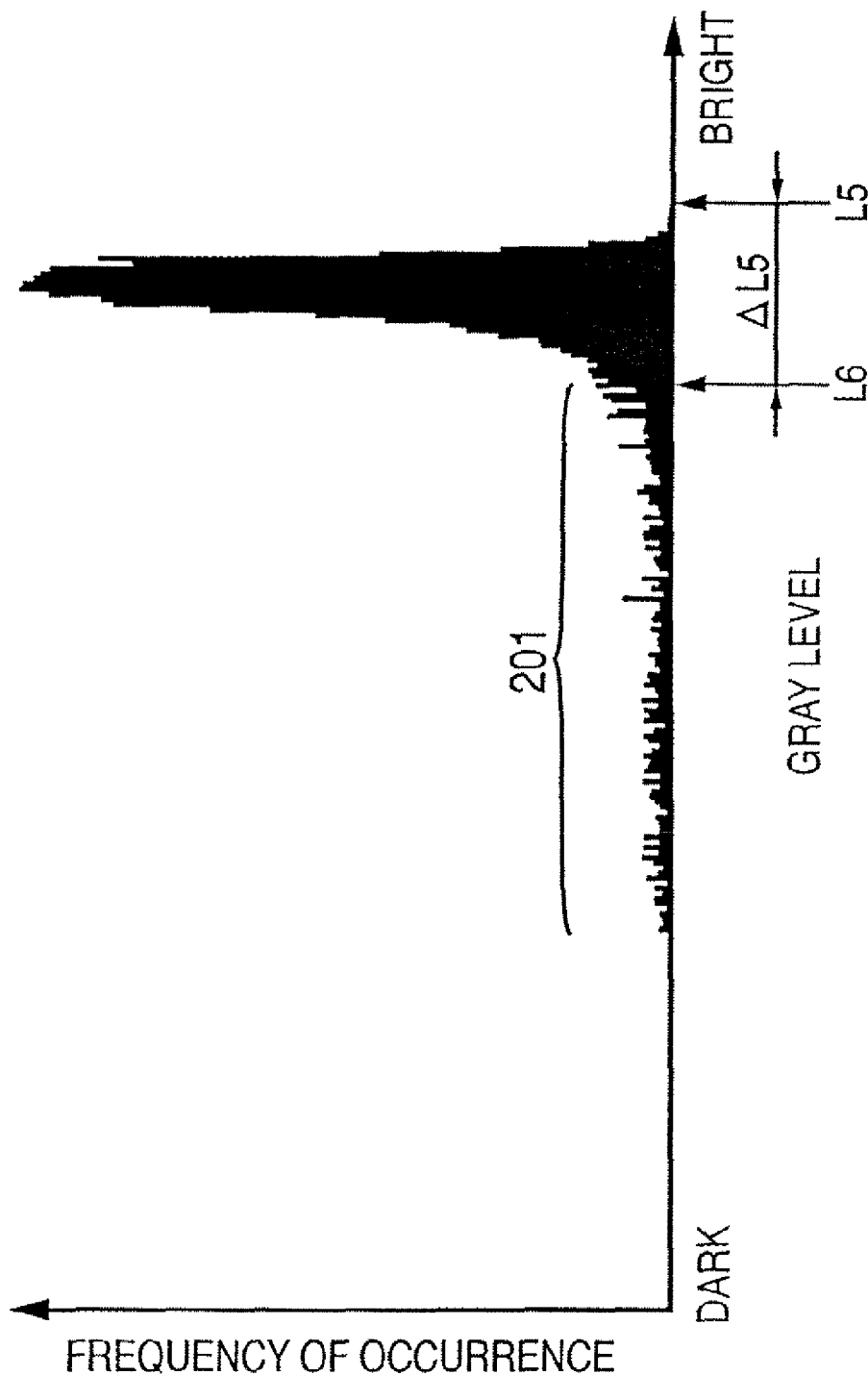
FIG. 9 shows a histogram of an image read using the infrared lamp according to the third embodiment of the present invention.
Figure 10:
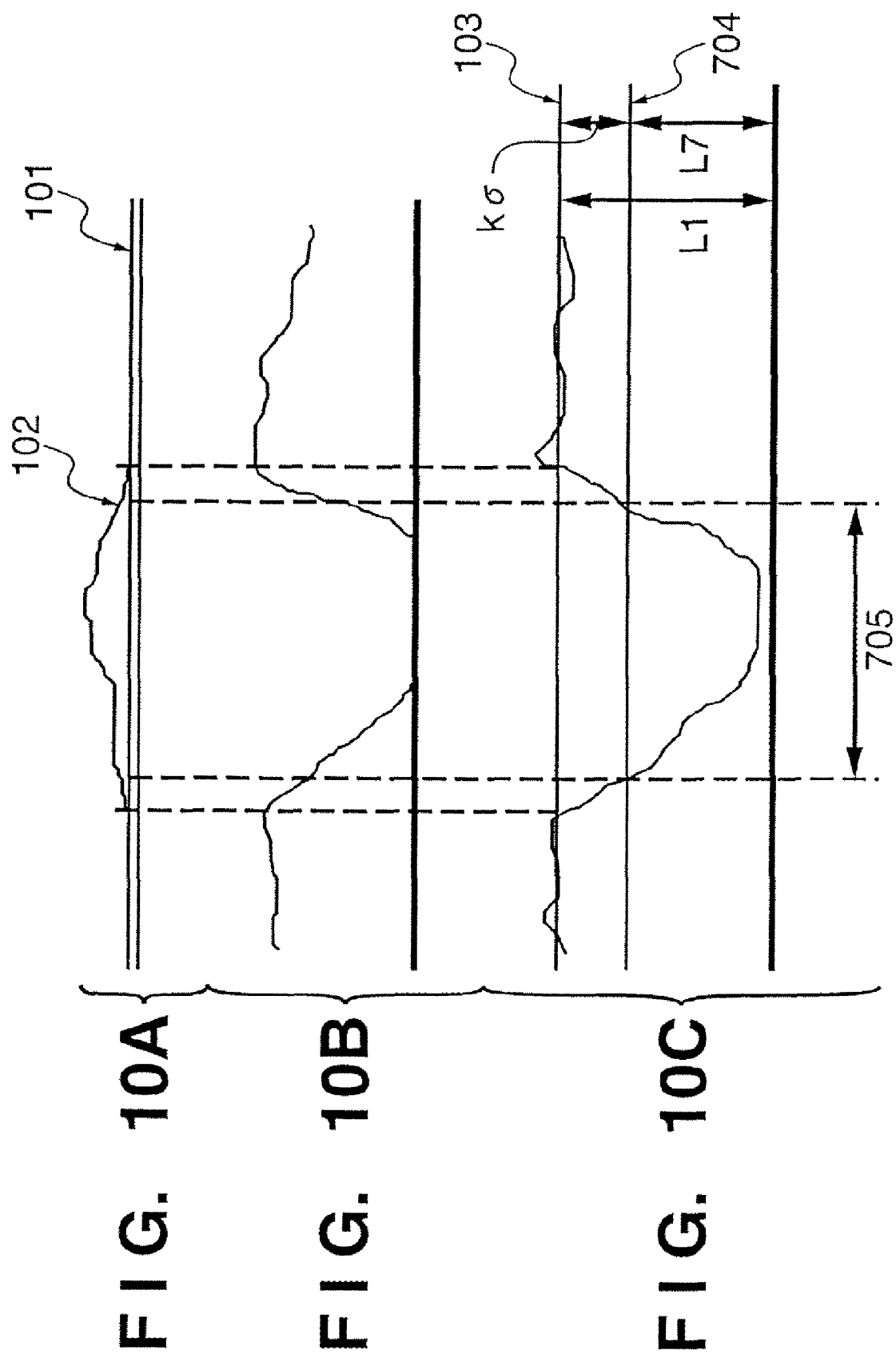
FIGS. 10A to 10C show the relationship between dust on a film, and the gray levels obtained by reading a film using a transparent document illumination lamp and infrared lamp according to the fifth embodiment of the present invention.

FIG. 9 shows an example of a histogram generated based on the gray levels of an infrared image read out from the infrared image memory 23 as in the first embodiment. The ordinate plots the frequencies of occurrence for respective pixels, and the abscissa plots the gray level.

The threshold value determination/save unit 32 obtains a maximum gray level L5 from the histogram generated. In the example shown in FIG. 9, the maximum gray level of the entire image data is L5, as also indicated by 503 in FIG. 8C. Since the maximum gray level of the entire image corresponds to a portion where no dust 102 is present, the maximum gray level L5 becomes equal to the maximum gray level of an image other than the dust 102. The gray levels of the dust 102 have a distribution, as indicated by 201 in FIG. 9, and are lower than the maximum gray level L5.

Therefore, the third embodiment obtains this maximum gray level L5, and sets a threshold value used to detect dust 102 at a gray level L6 a predetermined level .DELTA.L5 lower than this gray level L5 to locate it near the maximum value of the gray level distribution 201 of dust 102. Note that this predetermined level .DELTA.L5 may be pre-set and stored in the threshold value determination/save unit 32, or the generated histogram and gray level L5 may be displayed on a display, and the user may manually input .DELTA.L5.

In the third embodiment, the threshold value L6 obtained in this way is used in place of the threshold value L2 in step S30 in FIG. 2.

As described above, according to the third embodiment, the dust 102 can be nearly accurately detected as a defect region 505 detected using a threshold value level 504, i.e., the threshold value L6.

Fourth Embodiment

The fourth embodiment will be described below.

The fourth embodiment determines a threshold value using an average gray level unlike in the first to third embodiments. Since the operations are the same as those in the first to third embodiments except for the threshold value determination method, a description thereof will be omitted. The threshold value determination operation will be described below.

As in the first embodiment, a histogram is generated on the basis of the gray levels of an infrared image read out from the infrared image memory 23. The threshold value determination/save unit 32 obtains an average gray level Lave of the histogram generated. The unit 32 obtains a threshold value Lth1 by subtracting a predetermined value .DELTA.Lave from Lave. This process can be described by:

$Lth1 = Lave - .DELTA.Lave$

Note that this predetermined level .DELTA.Lave may be pre-set and stored in the threshold value determination/save unit 32, or the generated histogram and average gray level Lave may be displayed on a display, and the user may manually input .DELTA.Lavhe fifth embodiment will be described below.

In the fifth embodiment, the values .DELTA.L1, .DELTA.L3, .DELTA.L5, and .DELTA.Lave used in the first to fourth embodiments are set using a standard deviation calculated from histogram data of an image read using the infrared lamp 151 in FIG. 29. This embodiment will be explained below with reference to FIGS. 10A to 10C and FIG. 11 taking as an example the method of determining a threshold value based on the gray level corresponding to the intermediate value of the frequencies of occurrence in the first embodiment. Note that the same reference numerals in e.

In the fourth embodiment, the threshold value Lth1 obtained in this way is used in place of the threshold value L2 in step S30 in FIG. 2.

As described above, according to the fourth embodiment, a dust portion can be nearly accurately detected as a defect region detected using the threshold value Lth1.

Fifth Embodiment

FIGS. 10A to 10C and FIG. 11 denote common ones to those in FIGS. 4A to 4C and FIG. 5, and a description thereof will be omitted.

Figure 11:
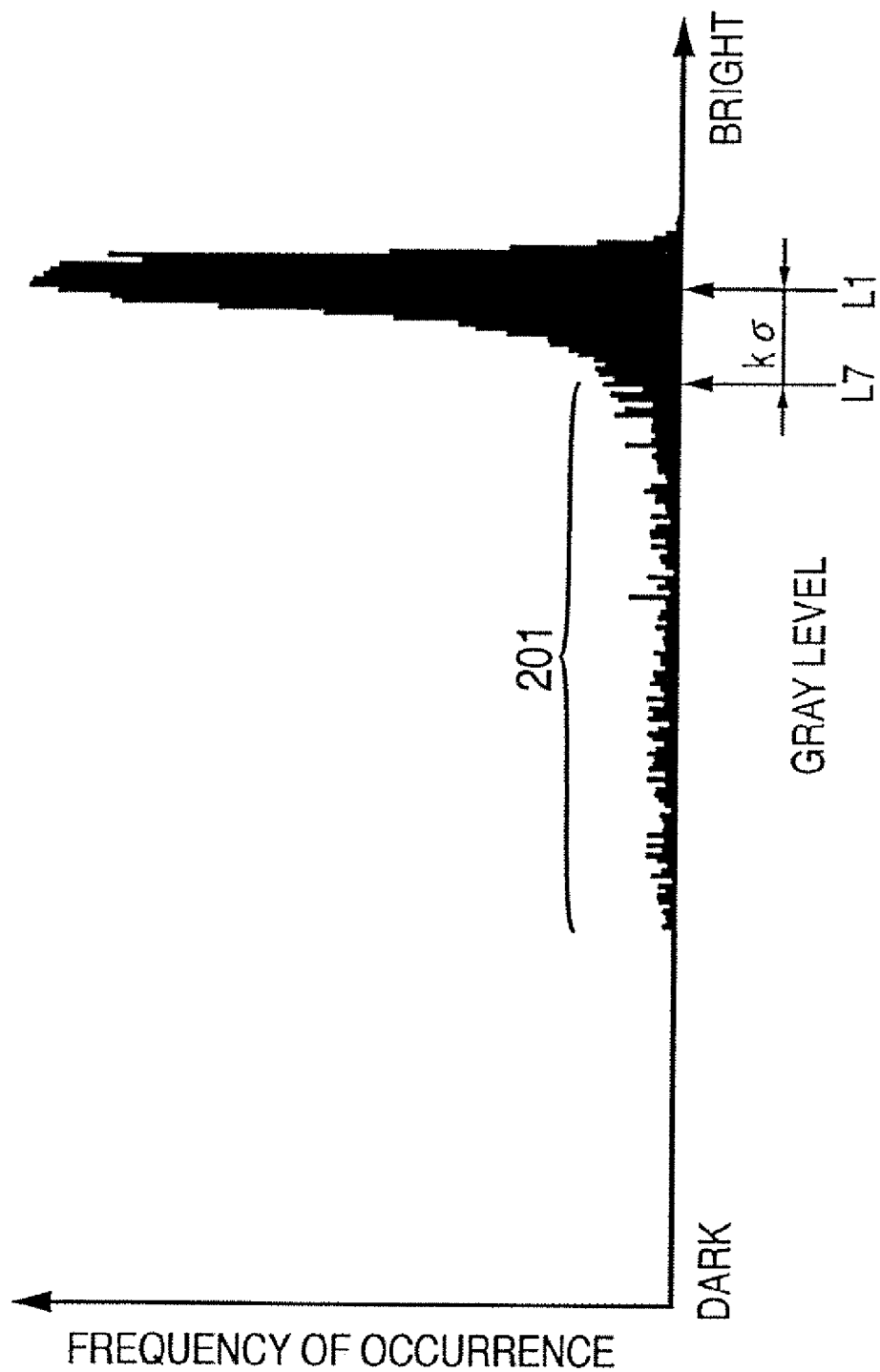
FIG. 11 shows a histogram of an image read using the infrared lamp according to the fifth embodiment of the present invention.

As shown in FIG. 11, a standard deviation .sigma. of a histogram generated based on the gray levels of an infrared image read out from the infrared image memory 23 is calculated. In general, since the occupation ratio of dust 102 in the overall image is small, the standard deviation .sigma. becomes nearly equal to that of the gray levels of an image other than the dust 102.

Then, a threshold value used to detect dust 102 is set at a gray level L7 the standard deviation .sigma..times.k (k is an arbitrary positive value) lower than the gray level L1 corresponding to the intermediate value of the frequencies of occurrence so as to be located near the maximum value of the gray level distribution 201 of dust 102. Note that the value k can be appropriately determined depending on the method of one of the first to fourth embodiments used.

In the fifth embodiment, the threshold value L7 obtained in this way is used in place of the threshold value L2 in step S30 in FIG. 2.

As described above, according to the fifth embodiment, the dust 102 can be nearly accurately detected as a defect region 705 detected using a threshold value level 704, i.e., the threshold value L7.

Sixth Embodiment

The sixth embodiment will be described below.

The sixth embodiment determines a threshold value using the maximum gray level using a method different from that in the third embodiment which determines the threshold value using the maximum gray level L5. Note that a maximum gray level Lmax is the same as the maximum gray level L5 in the third embodiment. Since the operations are the same as those in the first to fifth embodiments except for the threshold value determination method, a description thereof will be omitted. The threshold value determination operation will be described below.

As in the first embodiment, a histogram is generated on the basis of the gray levels of an infrared image read out from the infrared image memory 23. The threshold value determination/save unit 32 obtains a maximum gray level Lmax of the histogram generated. The unit 32 then multiplies the maximum gray level Lmax by a predetermined coefficient n (<1) to obtain a threshold value Lth2. This process can be described by:

Lth2=Lmax.times.n

Note that this coefficient n may be pre-set and stored in the threshold value determination/save unit 32, or the generated histogram and maximum gray level Lmax may be displayed on a display, and the user may manually input the coefficient n.

In the sixth embodiment, the threshold value Lth2 obtained in this way is used in place of the threshold value L2 in step S30 in FIG. 2.

As described above, according to the sixth embodiment, a dust portion can be nearly accurately detected as a defect region detected using the threshold value Lth2.

Seventh Embodiment

The seventh embodiment will be described below.

The seventh embodiment determines a threshold value using the average and maximum gray levels unlike in the first to sixth embodiments. Note that an average gray level Lave is the same as the average gray level Lave in the fourth embodiment, and a maximum gray level Lmax is the same as the maximum gray level L5 as in the third embodiment. Since the operations are the same as those in the first to sixth embodiments except for the threshold value determination method, a description thereof will be omitted. The threshold value determination operation will be described below.

As in the first embodiment, a histogram is generated on the basis of the gray levels of an infrared image read out from the infrared image memory 23. The threshold value determination/save unit 32 obtains an average gray level Lave and maximum gray level Lmax of the histogram generated. The unit 32 then obtains a threshold value Lth3 by multiplying the difference between the maximum gray level Lmax and average gray level Lave by a predetermined coefficient n, and subtracting the obtained product from the average gray level Lave. This process can be described by:

Lth3=Lave−(Lmax−Lave).times.n

Note that this coefficient n may be pre-set and stored in the threshold value determination/save unit 32, or the generated histogram, maximum gray level Lmax, and average gray level Lave may be displayed on a display, and the user may manually input the coefficient n.

In the seventh embodiment, the threshold value Lth3 obtained in this way is used in place of the threshold value L2 in step S30 in FIG. 2.

As described above, according to the seventh embodiment, a dust portion can be nearly accurately detected as a defect region detected using the threshold value Lth3.

Eighth Embodiment

The eighth embodiment will be described below.

Figure 12:
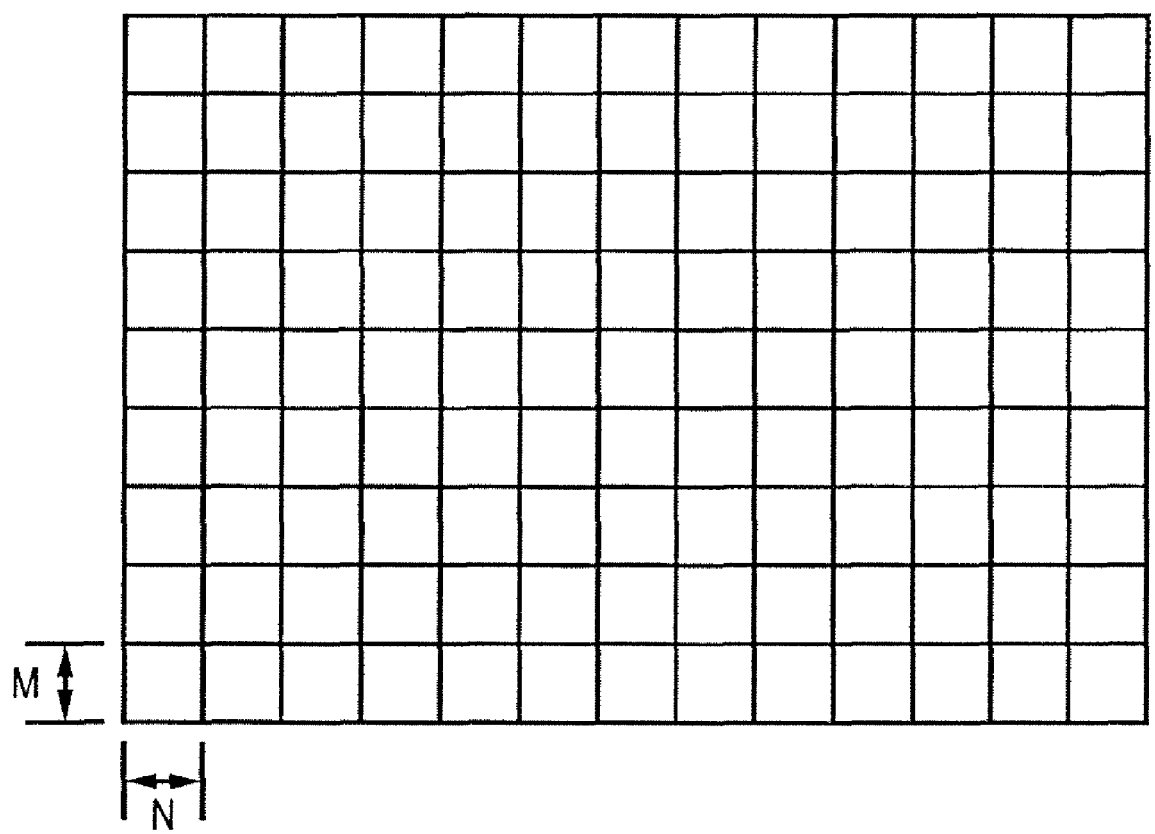
FIG. 12 shows an image broken up into blocks according to the eighth embodiment of the present invention.

In the first to seventh embodiments, a threshold value used to detect dust is set on the basis of histogram data of the entire image read using the infrared lamp 151 in FIG. 29. In the eighth embodiment, the entire image is broken up into blocks each having a predetermined size of M pixels.times.N pixels, as shown in FIG. 12, histograms are generated for respective blocks, and threshold values used to detect dust are set on the basis of those histograms. Such method of setting threshold values for respective blocks is effective upon reading a color film in which the transmittance of a cyan dye is insufficient.

Figure 13:
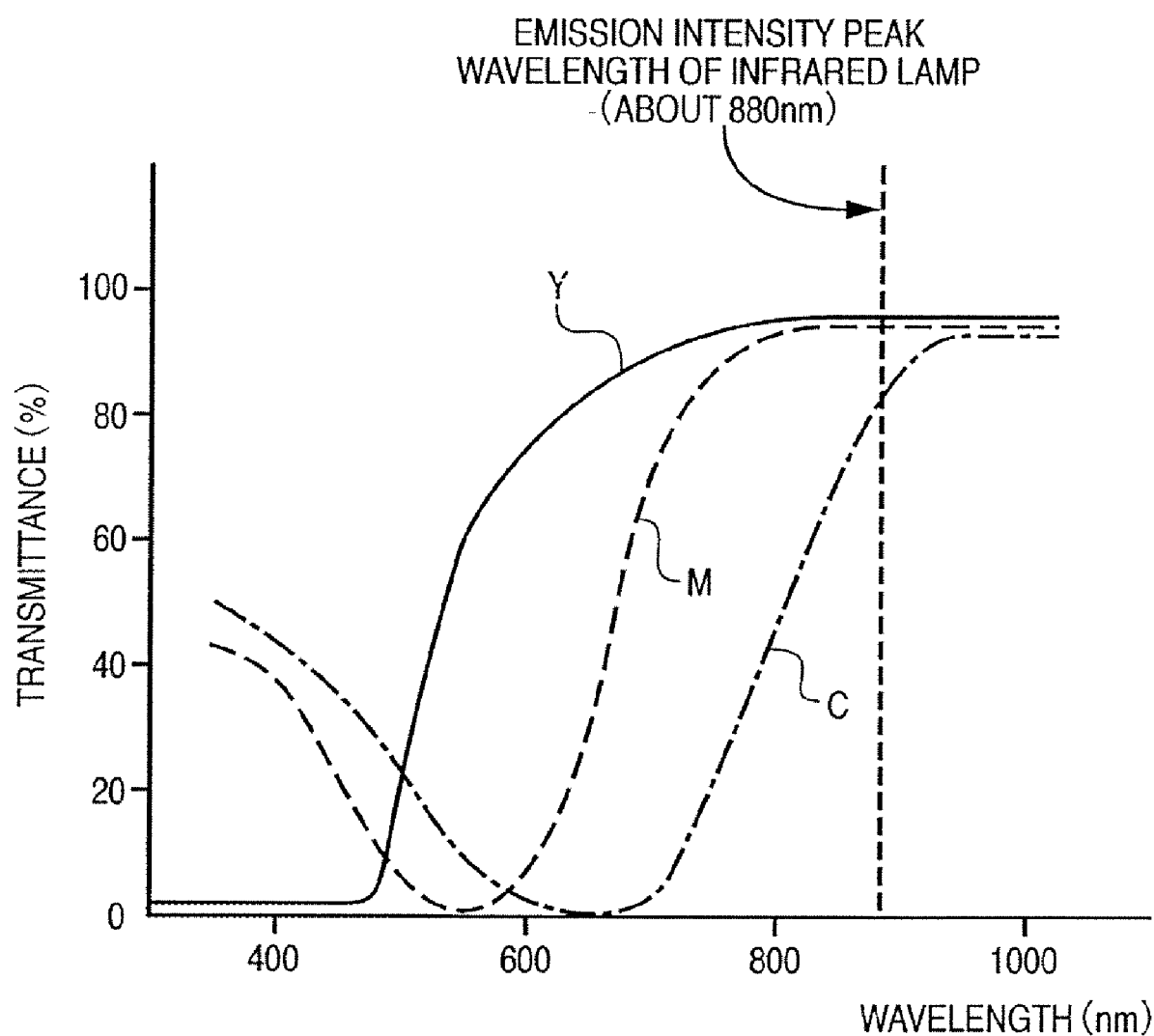
FIG. 13 is a graph showing the spectral transmittance characteristics of dyes of three colors in a color film of a given type, and the peak wavelength of the spectral intensity distribution of an infrared lamp.
Figure 14:
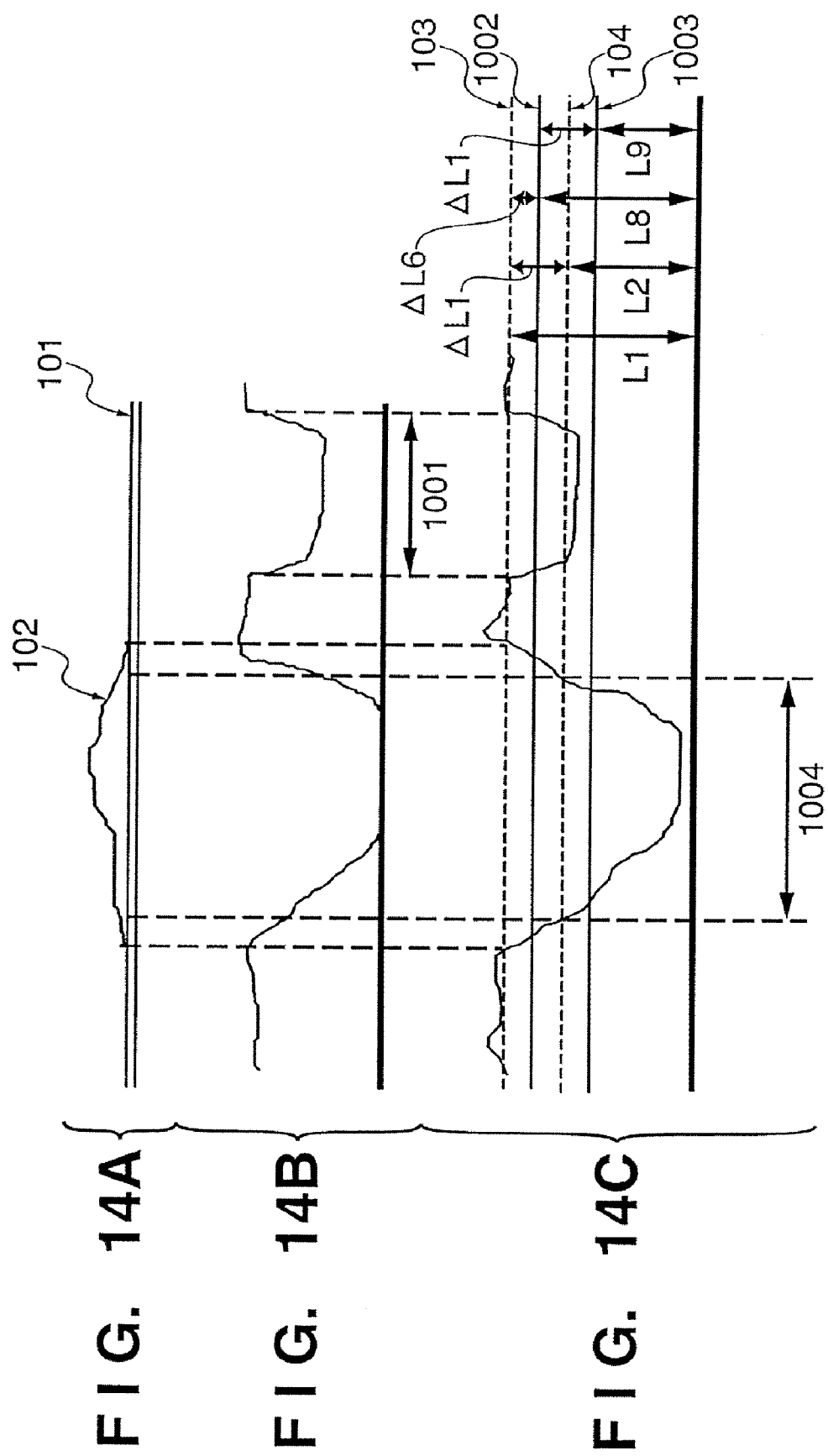
FIGS. 14A to 14C show the relationship between dust on a film, and the gray levels obtained by reading a film using a transparent document illumination lamp and infrared lamp according to the eighth embodiment of the present invention.

FIG. 13 shows the spectral transmittance characteristics of dyes of three colors (yellow, magenta, cyan) in a color film of a given type, and the peak wavelength (about 880 nm) of the spectral intensity distribution of the infrared lamp 151. When an image on the film contains a cyan dye, since the transmittance of cyan at about 880 nm is lower than those of yellow and magenta, the gray levels of the read image of that portion lower, and grayscale data of a film image mixes in an infrared image. In such case, since threshold values are set for respective blocks, determination errors of a defect region can be eliminated.

The process in the eighth embodiment will be described below with reference to FIGS. 12 to 14C. Note that the same reference numerals in FIGS. 14A to 14C denote common ones to those in FIGS. 4A to 4C, and a description thereof will be omitted.

FIG. 14A shows a state wherein dust 102 is present on a positive film 101, FIG. 14B shows the gray level obtained when a portion in FIG. 14A is read using the transparent document illumination lamp 144 shown in FIG. 29, and FIG. 14C shows the gray level obtained when the portion in FIG. 14A is read using the infrared lamp 151 in FIG. 29. In the example of the eighth embodiment shown in FIGS. 14A to 14C, a grayscale data component 1001 of a positive image slightly mixes in addition to dust 102 on the positive film 101.

Such infrared image is broken up into blocks each having a predetermined size, and histograms are calculated for respective blocks. Since the size of an objective region where the histogram is to be generated is reduced, the influence of the frequencies of occurrence of the grayscale data component 1001 of the positive image becomes larger, as shown in FIG. 14C, and a gray level 1002 corresponding to the central value of the frequencies of occurrence of the histogram becomes L8 which is .DELTA.L6 lower than L1 in the first embodiment.

Therefore, when a threshold value for dust detection is set by the same method as in the first embodiment, a threshold level 1003 (L9) becomes .DELTA.L1 lower than L8, and the dust 102 can be nearly accurately detected as a defect region 1004 without being influenced by the mixed grayscale data of the positive image, and determination errors of a cyan region can be eliminated.

In the eighth embodiment, the threshold value L9 obtained in this way is used in place of the threshold value L2 in step S30 in FIG. 2.

As described above, according to the eighth embodiment, since defect regions due to dust are calculated for respective blocks, even when grayscale data of a film image is in a portion other than dust of an image read using the infrared lamp 151, only the dust portion can be nearly accurately detected.

When a dust/scratch correction region is determined by combining defect regions detected for respective blocks in the eighth embodiment, and a defect region detected in the first to seventh embodiments, correction with higher accuracy can be achieved.

Ninth Embodiment

The ninth embodiment will be described below with reference to FIGS. 15A to 15C. Note that the same reference numerals in FIGS. 15A to 15C denote common ones to those in FIGS. 4A to 4C, and a description thereof will be omitted.

As has been explained in the first to eighth embodiments, since a threshold value for dust detection is set using histogram data of an infrared image read using the infrared lamp 151, only the dust portion can be nearly accurately detected. But this threshold value is set to be lower than the average value of a dust-free portion. Hence, a region to be detected is slightly narrower than a region which is actually influenced by dust.

Figure 15:
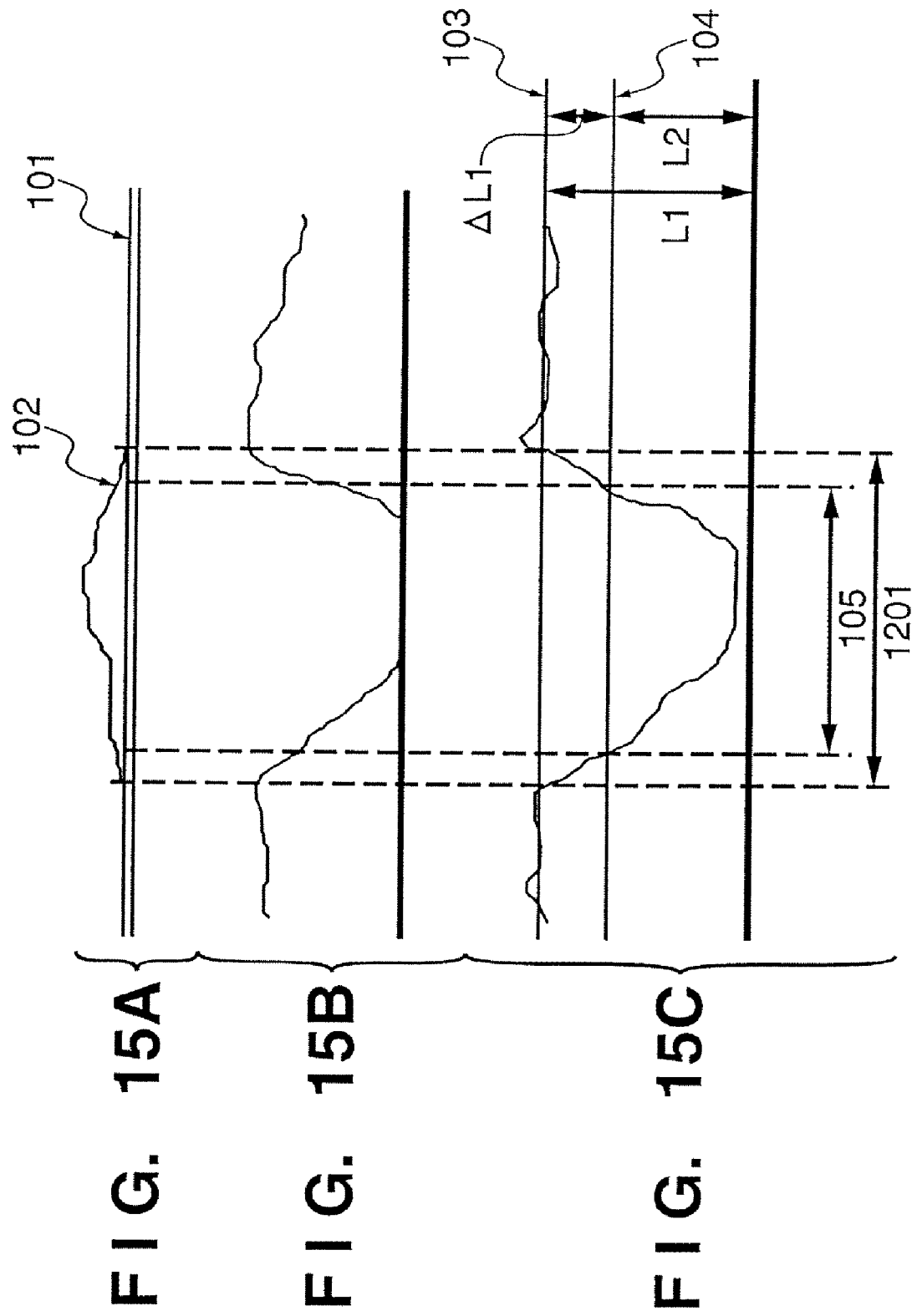
FIGS. 15A to 15C show the relationship between dust on a film, and the gray levels obtained by reading a film using a transparent document illumination lamp and infrared lamp according to the ninth embodiment of the present invention.

Therefore, when a defect region 105 is detected by the method described in, e.g., the first embodiment, the ninth embodiment sets a range 1201 a predetermined size broader than the detected defect region 105 as an actual defect region, as shown in FIG. 15C.

Also, when the dust position on a read image using the transparent document illumination lamp 144 and that on a read image using the infrared lamp slight deviate from each other, the influence of such deviation can be greatly relaxed by applying the ninth embodiment.

Tenth Embodiment

The tenth embodiment will be described below with reference to FIGS. 16A to 16C. Note that the same reference numerals in FIGS. 16A to 16C denote common ones to those in FIGS. 4A to 4C, and a description thereof will be omitted.

The tenth embodiment will explain a method which is effective when the sharpness of dust on a read image using the infrared lamp is lower than that of dust on a read image using the transparent document illumination lamp 144. Such phenomenon may occur due to out of focus, i.e., so-called chromatic aberration of a lens, since the emission main wavelength of the infrared lamp is longer than the visible wavelength range (400 nm to 700 nm) used in an image read using the transparent document illumination lamp 144.

Figure 16:
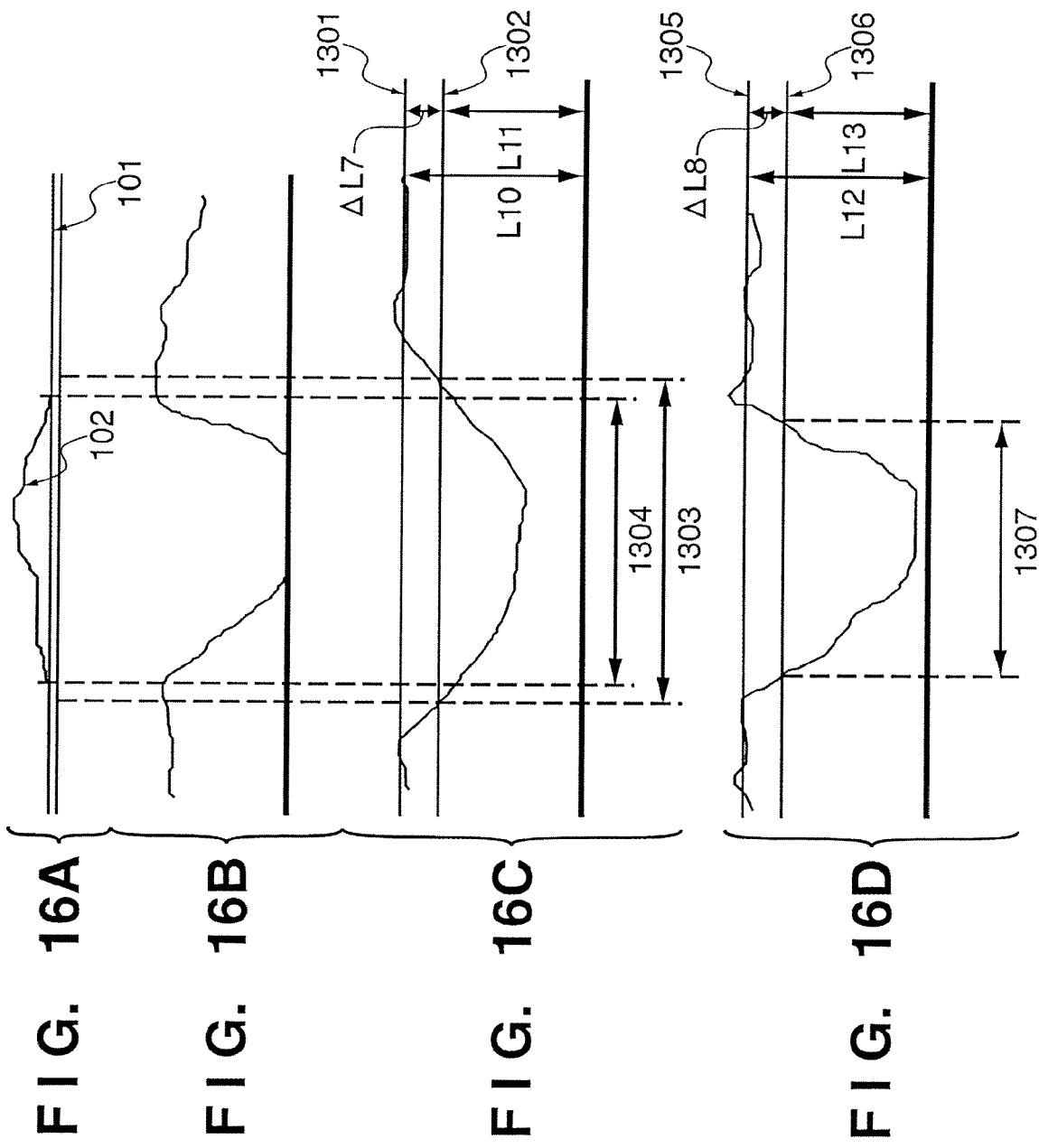
FIGS. 16A to 16D show the relationship between dust on a film, and the gray levels obtained by reading a film using a transparent document illumination lamp and infrared lamp according to the seventh and eleventh embodiments of the present invention.

In such case, as shown in FIG. 16C, the grayscale data of a portion of dust 102 of an image read using the infrared lamp 151 becomes broader than an actual region of dust 102. At this time, when a threshold value L11 used to detect any defect region is set at a level 1302 .DELTA.L7 lower than a gray level 1301 corresponding to the intermediate value of the frequencies of occurrence of histogram data, i.e., L10, a detected defect region 1303 becomes broader than the actual dust region. Hence, in the tenth embodiment, a range 1304 a predetermined size narrower than the detected defect region 1303 is determined as an actual defect region as shown in FIG. 16C, thus allowing appropriate correction.

Eleventh Embodiment

The eleventh embodiment of the present invention will be described below with reference to FIGS. 16A to 16D.

The eleventh embodiment will explain a method which is effective when the sharpness of dust on a read image using the infrared lamp 151 is lower than that of dust on a read image using the transparent document illumination lamp 144, as in the tenth embodiment.

In the eleventh embodiment, when the grayscale data of a portion of dust 102 of an image read using the infrared lamp 151 appears in a region broader than an actual region of dust 102, as shown in FIG. 16C, the image read using the infrared lamp 151 temporarily undergoes edge correction, as shown in FIG. 16D, so as to set its sharpness to be nearly equal to that of dust on an image read using the transparent document illumination lamp 144. After that, since a threshold value used to detect any defect region is set at a level 1306, i.e., L13 which is .DELTA.L8 lower than a gray level 1305 corresponding to the average frequency of occurrence of histogram data, i.e., L12, the dust 102 can be nearly accurately detected as a defect region 1307, which is detected using the threshold level 1306.

In the eleventh embodiment, the method and amount of edge correction mentioned above are not particularly specified. When the sharpness of dust on an image read using the infrared lamp 151 impairs due to chromatic aberration of a lens, as described above, it is more effective to set the method and amount of edge correction so as to correct MTF deterioration components due to that chromatic aberration.

Twelfth Embodiment

The twelfth embodiment of the present invention will be described below. The twelfth embodiment will explain a case wherein a film holder is used upon reading a transparent document.

Figure 17:
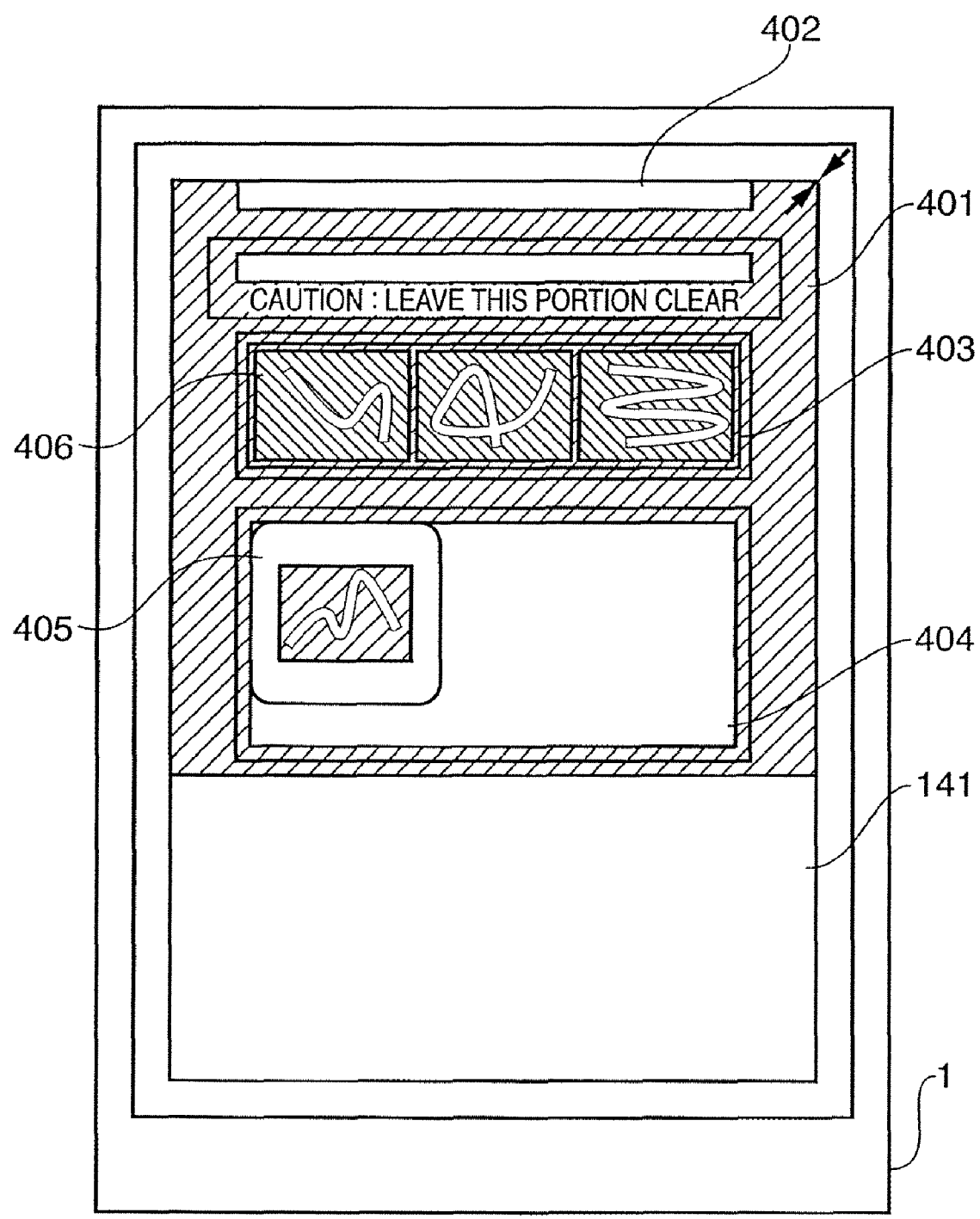
FIG. 17 is a top view when a film holder is set on a platen glass of an image reading apparatus according to the twelfth embodiment of the present invention.

FIG. 17 is a top view when a film holder used to set a positive or negative film on the platen glass 14 of the image reading apparatus 1 upon reading a transparent document. Referring to FIG. 17, reference numeral 401 denotes a film holder as a whole, which is set at a predetermined position on the platen glass 14. Reference numeral 402 denotes a hole used to check the presence/absence and amount of light coming from the transparent document illumination lamp 144 and infrared lamp 151 using the CCD 150. An area 403 is used to set a sleeve type film 406, and an area 404 is used to set a mount type film 405.

Upon actually reading a film, the user selects a film region while confirming an image previewed on a display of a PC connected to the image reading apparatus 1, and the selected region is read.

When the film holder 401 shown in FIG. 17 is used, since the read range can be freely selected on a preview image, the selected range may include the film holder. When dust/scratch detection and correction are done in such case by the method described in the first, second, fourth, fifth, and seventh to eleventh embodiments, data of the film holder 401 mixes in upon calculating the threshold value. As a result, a desired threshold value cannot be obtained, and dust/scratches to be removed may remain.

When the film and a portion of the film holder 401 around the film are read using the infrared lamp 151, since the portion (to be referred to as a "holder shadow" hereinafter) does not transmit any infrared light, the CCD 150 outputs low gray levels (normally ranging from 0 to 50 in case of 255 gray levels).

Figure 18A:
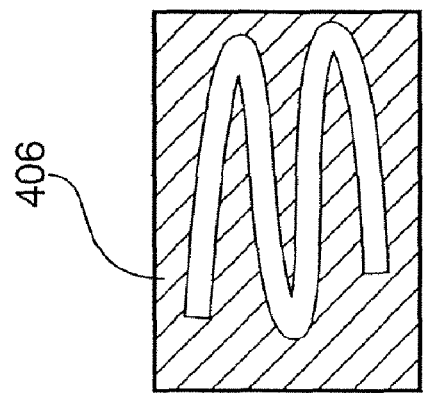
FIGS. 18A and 18B show a read region that does not include the film holder, and the histogram of an image obtained by reading that region using an infrared lamp.
Figure 18B:
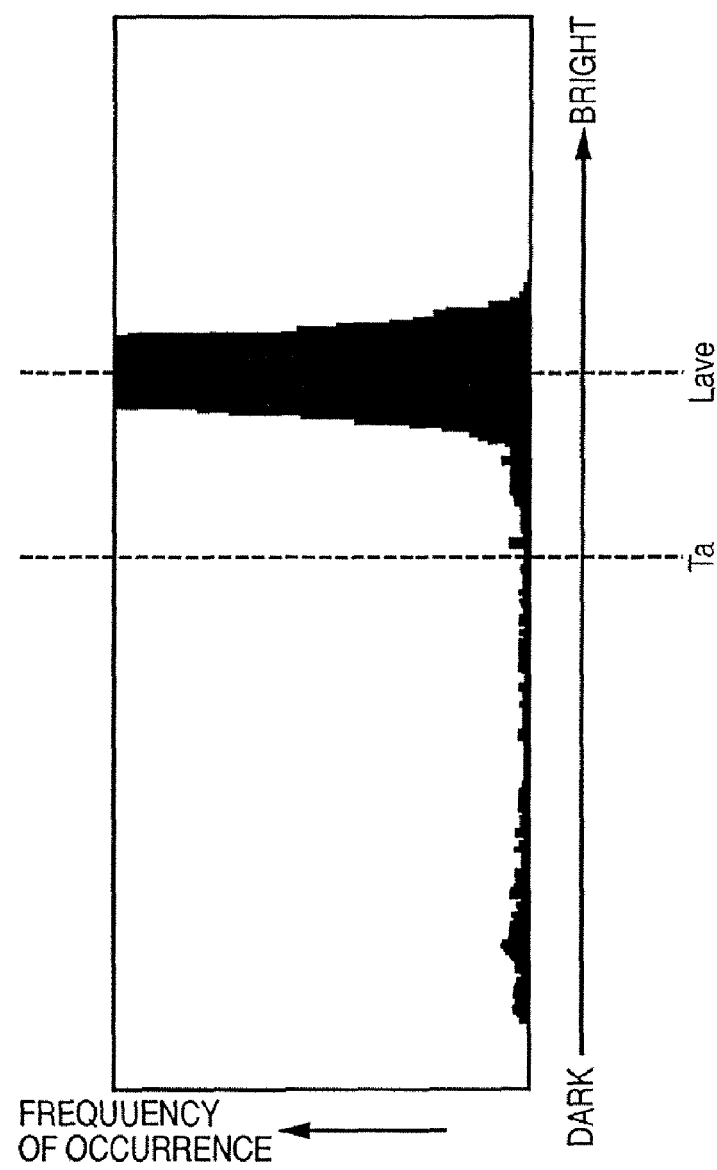

FIG. 18A shows a read region that does not include the film holder 401, and FIG. 18B shows an example of a histogram of an infrared image obtained by reading the region shown in FIG. 18A. FIG. 19A shows a read region that includes the film holder 401, and FIG. 19B shows an example of a histogram of an infrared image obtained by reading the region shown in FIG. 19A. As can be seen from FIG. 19B, since the film holder 401 is present in the read region, the frequencies of occurrence of lower levels are higher than those in FIG. 18B.

When the method of calculating a threshold value using the standard deviation .sigma. described in the fifth embodiment is applied to the example shown in FIGS. 19A and 19B, if Ta represents a threshold value obtained when the read region does not include the film holder 401, since the standard deviation .sigma. obtained when the film holder 401 is included becomes large, a threshold value Tb is lower than Ta. That is, when the film holder 401 is included, dust/scratches having gray levels between Ta and Tb remain uncorrected.

The twelfth embodiment will explain a method which can prevent dust/scratches from remaining uncorrected due to a low threshold value of dust/scratch discrimination obtained when the film holder 401 is included in the read region.

Figure 20:
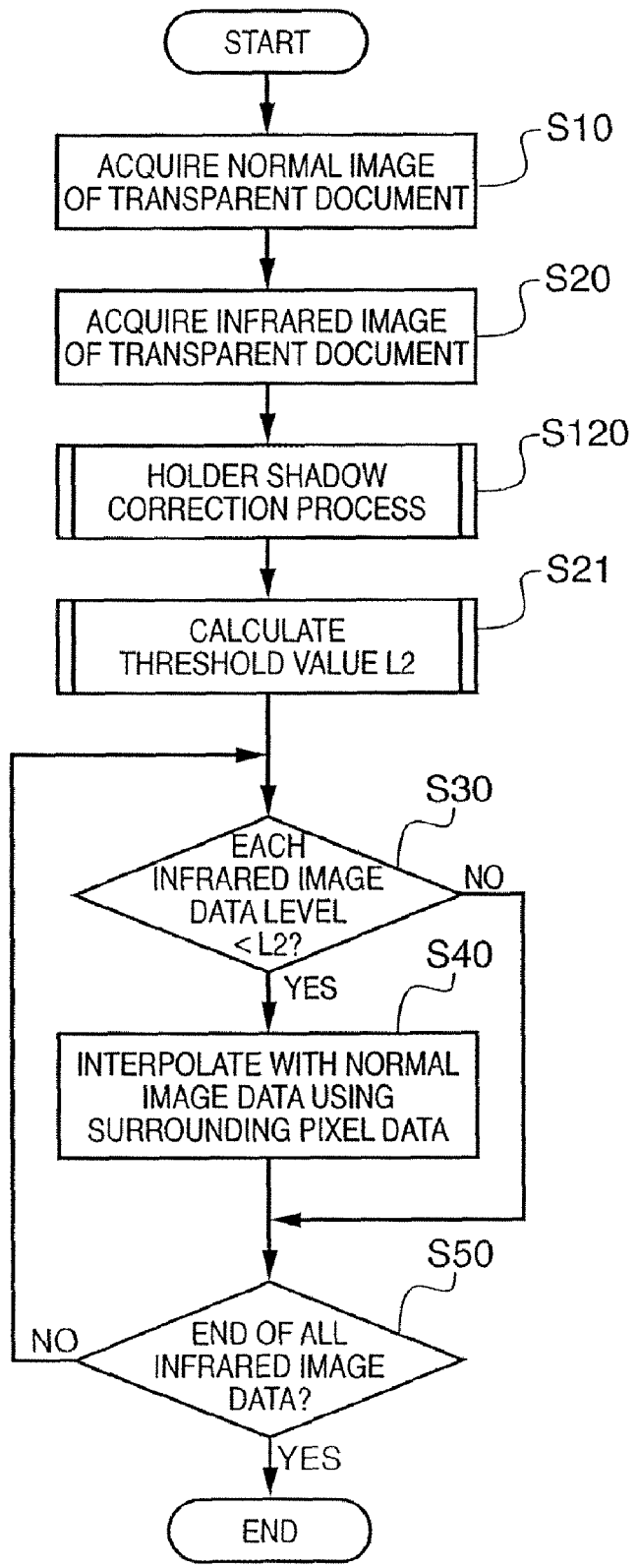
FIG. 20 is a flow chart showing the process in a dust/scratch remover according to the twelfth embodiment of the present invention.
Figure 21:
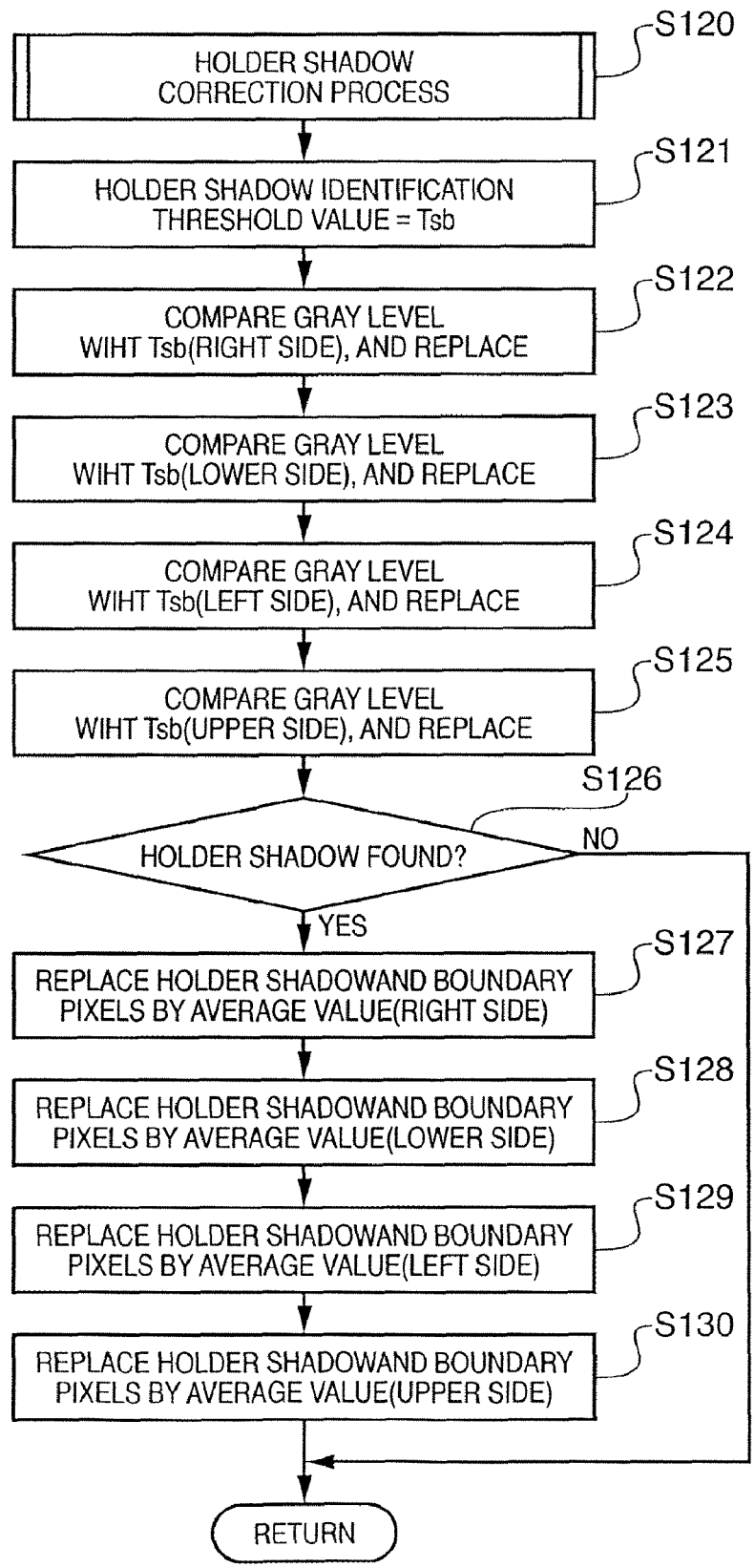
FIG. 21 is a flow chart showing a holder shadow correction process according to the twelfth embodiment of the present invention.

FIG. 20 is a flow chart showing the dust/scratch removal operation in the twelfth embodiment. The difference between FIGS. 20 and 2 is that a holder shadow correction process (step S120) is added between steps S20 and S21. Since other operations are the same as those in FIG. 2, the same step numbers are assigned to them, and a description thereof will be omitted. The holder shadow process in step S120 will be described in detail below with reference to FIGS. 19A to 27.

Figure 22:
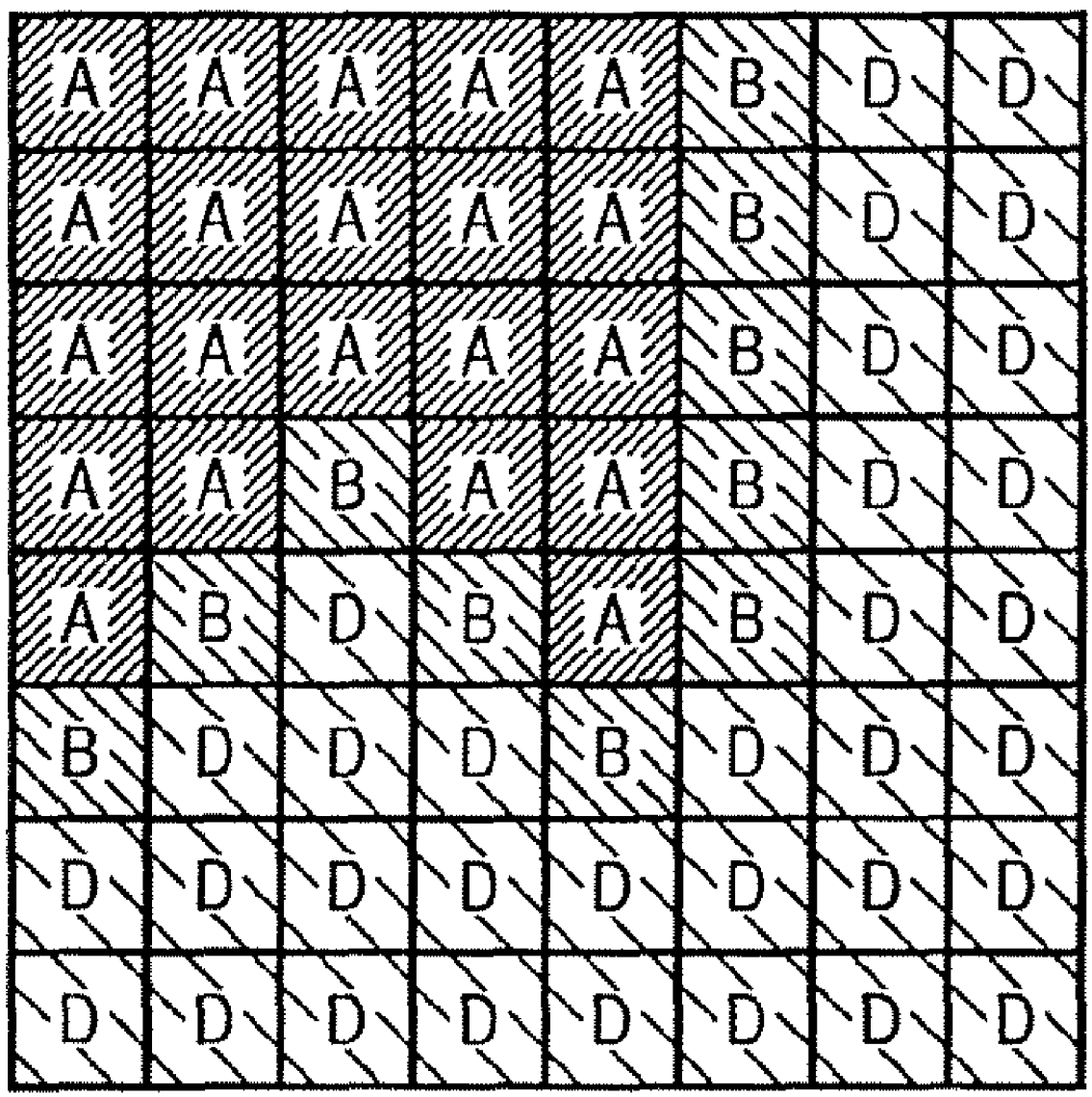
FIG. 22 is a view for explaining the holder shadow correction process operation according to the twelfth embodiment of the present invention.

Initially, it must be checked if the acquired infrared image includes a holder shadow. FIG. 22 partially shows a scan image with the film holder 401. Referring to FIG. 22, reference symbol D denotes pixels corresponding to a holder shadow; A, pixels printed with a normal document image; and B, pixels at a boundary between holder shadow pixels D and document pixels A. A film shadow appears on one of the four, upper, lower, right, and left sides of an image or a plurality of sides, as shown in FIG. 22. Since the holder shadow has a value lower than a given gray level, as described above, the holder shadow can be discriminated exploiting such nature. Therefore, a threshold value used to identify a holder shadow is set at Tsb in step S121.

Figure 23:
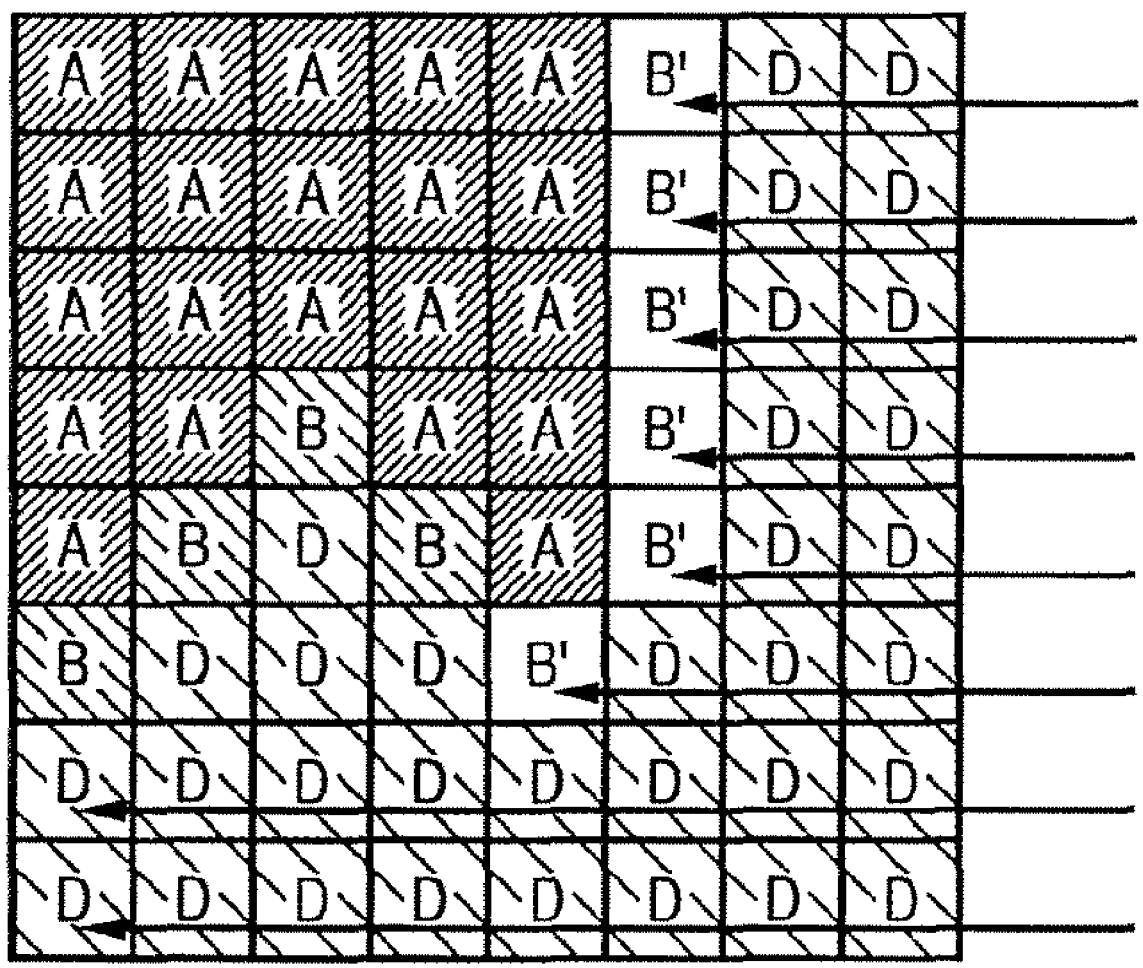
FIG. 23 is a view for explaining the holder shadow correction process operation according to the twelfth embodiment of the present invention.

In order to discriminate a holder shadow in an infrared image, the gray level is compared with the threshold value Tsb in turn from a pixel on the right side in step S122, as shown in FIG. 23. This comparison is made from the right side, and if the presence of a holder shadow pixel D is confirmed, the comparison continues until an end portion of holder shadow pixels D, i.e., a boundary pixel B in FIG. 22, appears. If the boundary pixel B appears, it is determined to be a boundary of the holder shadow, and a predetermined number of pixels are replaced by 255 (B') in case of 255 gray levels, as shown in FIG. 23. The number of pixels to be replaced becomes larger with increasing resolution. For example, in FIG. 22, one pixel is replaced.

Figure 24:
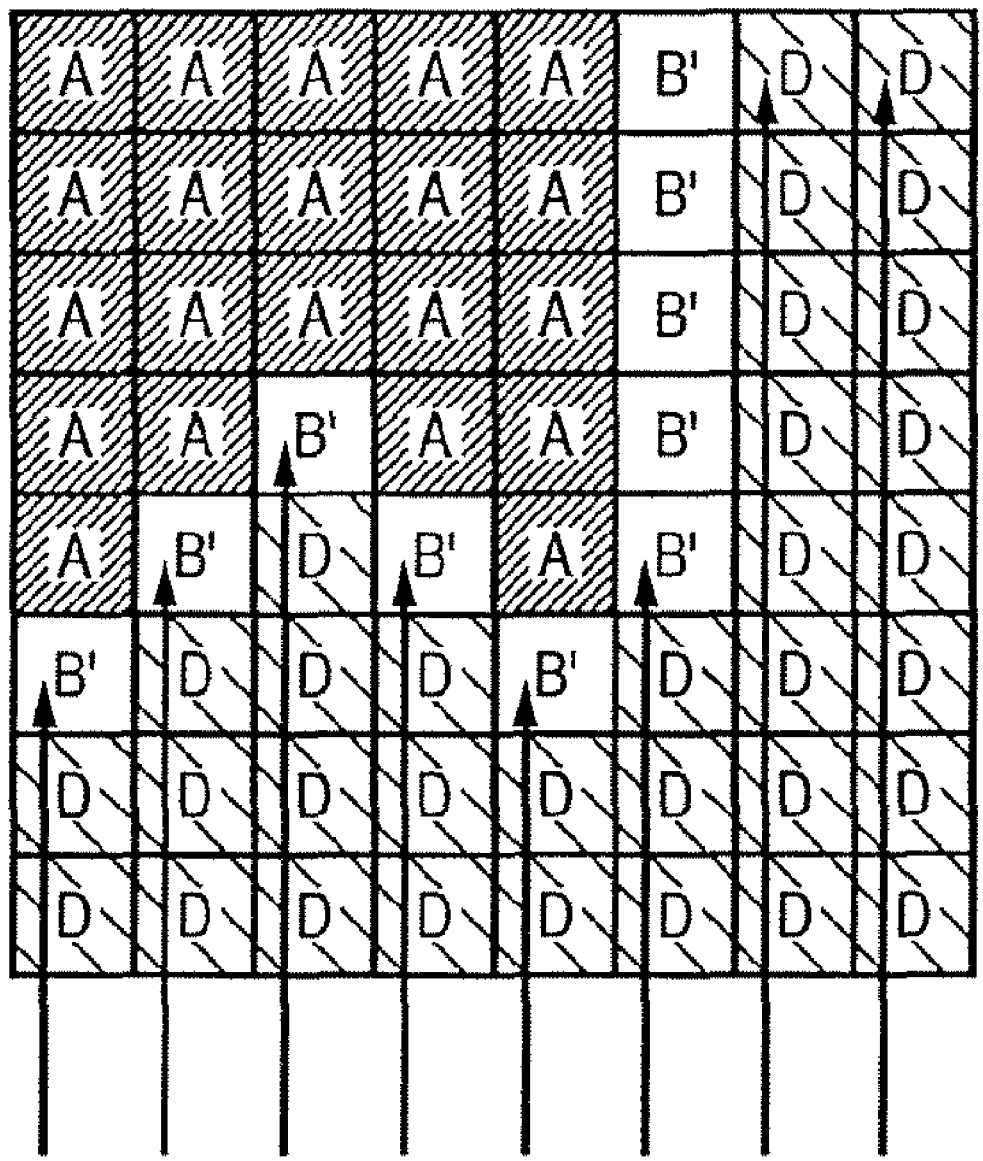
FIG. 24 is a view for explaining the holder shadow correction process operation according to the twelfth embodiment of the present invention.

In step S123, the same process is also done from the lower side (FIG. 24). Furthermore, the same process is similarly done from the left and upper sides in steps S124 and S125.

It is checked in step S126 if a holder shadow is present. This step can be easily implemented by storing the presence/absence of pixels replaced by the value B' in steps S122 to S125. If a holder shadow is not found, since holder shadow correction need not be made, the flow returns to step S21 in FIG. 20.

Figure 25:
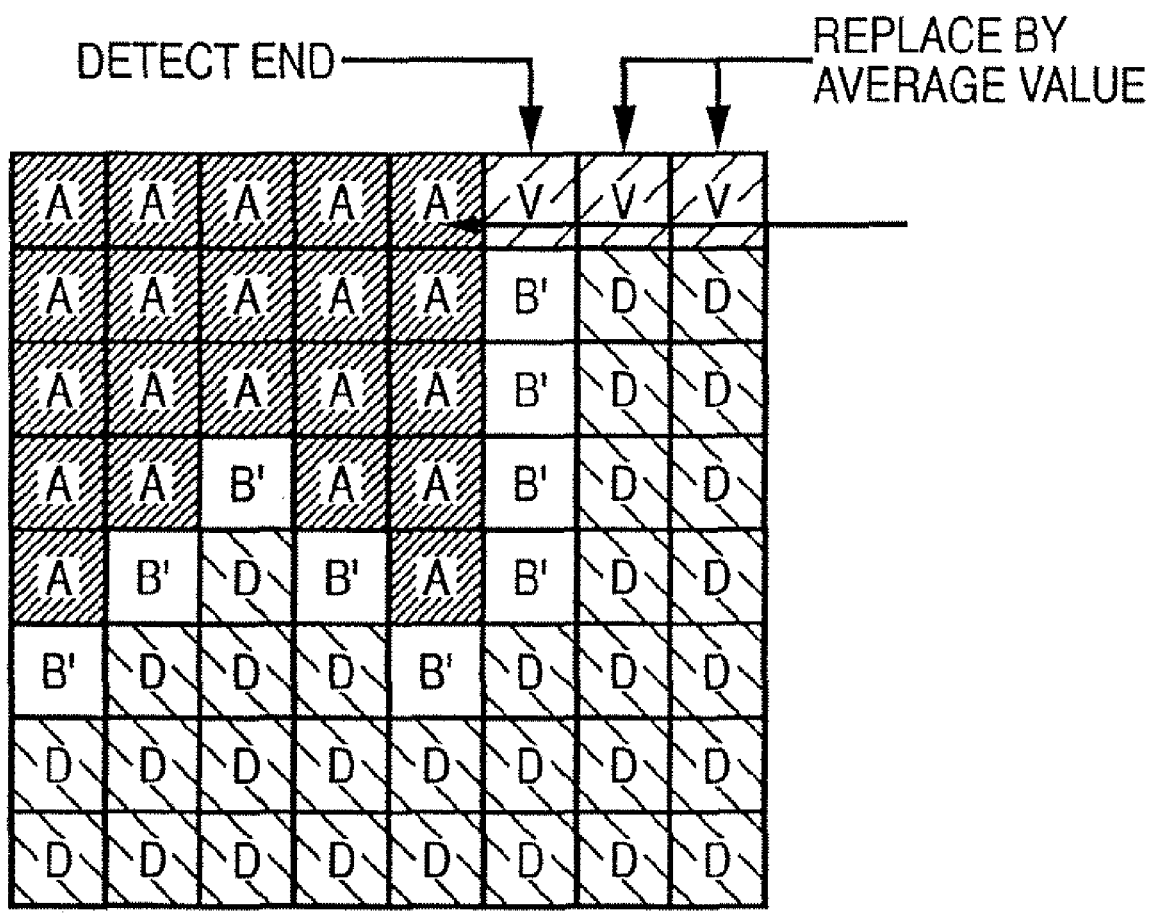
FIG. 25 is a view for explaining the holder shadow correction process operation according to the twelfth embodiment of the present invention.
Figure 26:
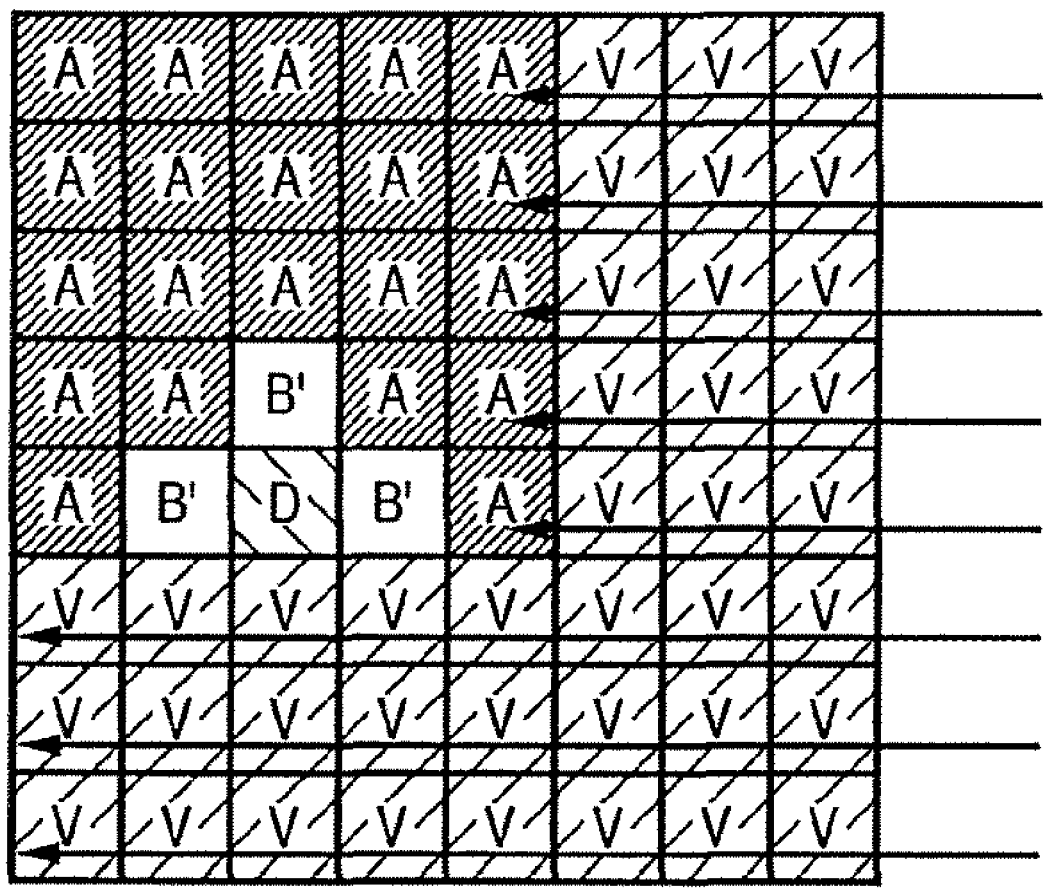
FIG. 26 is a view for explaining the holder shadow correction process operation according to the twelfth embodiment of the present invention.
Figure 27:
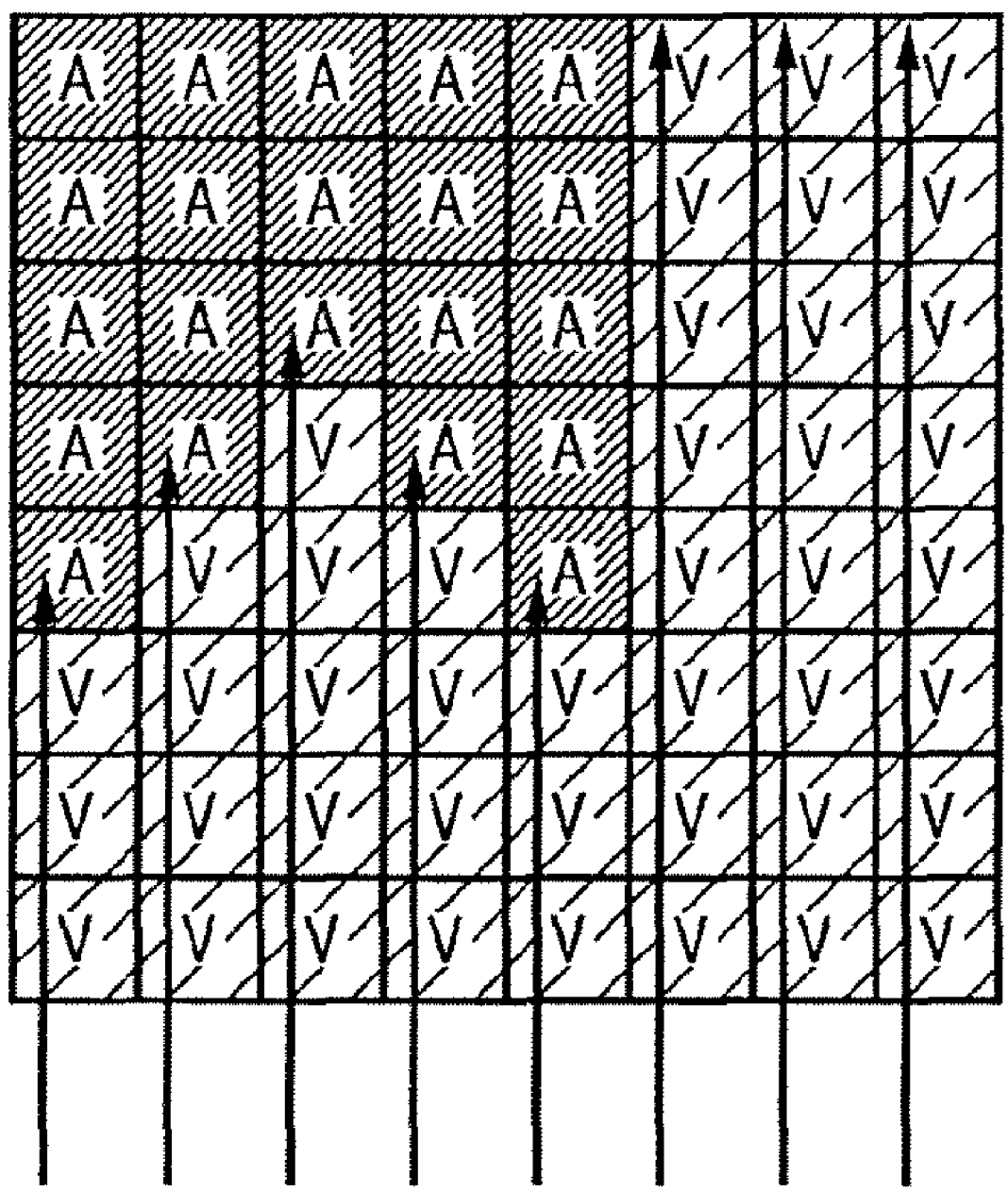
FIG. 27 is a view for explaining the holder shadow correction process operation according to the twelfth embodiment of the present invention.
Figure 28:
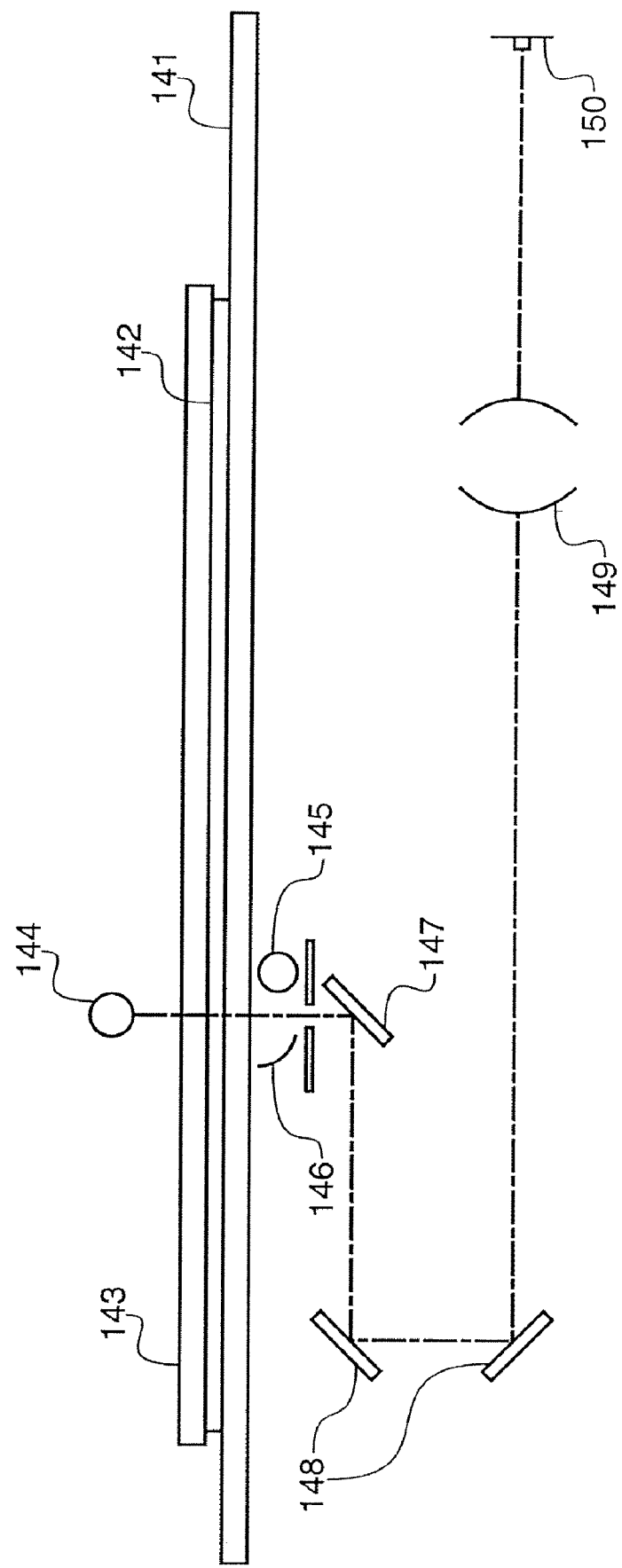
FIG. 28 is a schematic view showing the arrangement of a conventional image reading apparatus.

If a holder shadow is found (YES in step S126), the flow advances to step S127, a region B' replaced by 255, and a holder shadow region D, are replaced by an average value V of the gray levels of the entire read region in turn from the right side, as shown in FIG. 25. In this replace process, if the pixel of interest is a holder shadow pixel D or replaced pixel B' (level 255), it is replaced by the average value, and the next pixel is checked. If a pixel which is neither the pixel B' (level 255) nor the holder shadow pixel D is found, the replace process to the average value ends (FIG. 26). Upon completion of the process from the right side, the same process is repeated from the lower, left, and upper sides in steps S128 (FIG. 27), S129, and S130.

The boundary pixels between the holder shadow pixels D and document image pixels A are replaced by the average value like in the holder shadow pixels D for the following reason. Since the gray level of the boundary between the holder shadow and document image changes not discontinuously but continuously, a boundary portion remains after the dust/scratch process if only holder shadow pixels are replaced, and the processed image has an unwanted false edge.

As described above, the number of boundary pixels to be replaced increases with increasing resolution. This is because the number of boundary pixels that remain in an image increases with increasing resolution.

Upon completion of the replace process to the average value, the flow returns to step S21 in FIG. 20.

As described above, when the holder shadow pixels D and boundary pixels B are replaced by the average value, the standard deviation .sigma. of an image becomes smaller than that obtained when those pixels are not replaced, upon calculating a threshold value using the standard deviation .sigma.

For this reason, a threshold value used in dust/scratch discrimination can be prevented from lowering, and an appropriate threshold value can be obtained. Since those pixels are replaced by the average value, the influence of the presence of the holder shadow can be minimized compared to a case wherein the holder shadow pixels D are completely erased, thus leading to appropriate dust/scratch removal.

In the twelfth embodiment, a method suitable for the method of calculating the threshold value using the standard deviation .sigma. has been explained. Alternatively, when the holder shadow pixels D and boundary pixels B are not replaced but are removed in steps S127 to S130 in FIG. 21, an appropriate threshold value can be calculated in the threshold value calculation method of the first, second, fourth, and seventh embodiments.

As described above, according to the twelfth embodiment, even when the read range includes the film holder, appropriate dust/scratch correction can be achieved.

Other Embodiment

The present invention can be applied to a system constituted by a plurality of devices or to an apparatus comprising a single device.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore to apprise the public of the scope of the present invention, the following claims are made.

What is claimed is:

1. A signal processing method for processing a visible light image signal and an infrared image signal obtained by illuminating a transparent document with light beams respectively coming from a visible light source for mainly emitting visible light and an infrared light source for mainly emitting infrared light, and photoelectrically converting optical images of the transparent document, comprising:

a detection step of detecting signal components corresponding to a holder for holding the transparent document from the infrared image signal;

a replacement step of replacing, when the signal components corresponding to the holder are detected in the detection step, the signal components of the infrared image signal with a predetermined signal value;

a generation step of generating a histogram on the basis of the infrared image signal that has undergone the replacement step;

a calculation step of calculating a threshold value on the basis of the histogram generated in the generation step;

an extraction step of comparing the threshold value calculated in the calculation step with the infrared image signal that has not undergone the replacement step, and extracting infrared image signal components not more than the threshold value; and an interpolation step of executing an interpolation process of the visible light image signal on the basis of the infrared image signal components extracted in the extraction step.

2. The method according to claim 1, further comprising a step of calculating an average value of the infrared image signal, wherein the predetermined signal value used for replacement in the replacement step is the average value.

3. A signal processing method for processing a visible light image signal and an infrared image signal obtained by illuminating a transparent document with light beams respectively coming from a visible light source for mainly emitting visible light and an infrared light source for mainly emitting infrared light, and photoelectrically converting optical images of the transparent document, comprising:

a detection step of detecting signal components corresponding to a holder for holding the transparent document from the infrared image signal;

a step of removing, when the signal components corresponding to the holder are detected in the detection step, the signal components from the infrared image signal;

a generation step of generating a histogram on the basis of the infrared image signal that has undergone the removing step;

a calculation step of calculating a threshold value on the basis of the histogram generated in the generation step;

an extraction step of comparing the threshold value calculated in the calculation step with the infrared image signal that has not undergone the removing step, and extracting infrared image signal components not more than the threshold value; and an interpolation step of executing an interpolation process of the visible light image signal on the basis of the infrared image signal components extracted in the extraction step.

4. A signal processing apparatus for processing a visible light image signal and an infrared image signal obtained by illuminating a transparent document with light beams respectively coming from a visible light source for mainly emitting visible light and an infrared light source for mainly emitting infrared light and photoelectrically converting optical images of the transparent document comprising:

a detection unit adapted to detect signal components corresponding to a holder for holding the transparent document from the infrared image signal;

a replacement unit adapted to, when said detection unit detects the signal components corresponding to the holder, replace the signal components of the infrared image signal with a predetermined signal value;

a generation unit adapted to generate a histogram on the basis of the infrared image signal that has undergone the replacement process by said replacement unit;

a calculation unit adapted to calculate a threshold value on the basis of the histogram generated by said generation unit;

an extraction unit adapted to compare the threshold value calculated by the calculation unit with the infrared image signal that has not undergone the replacement process, and extract infrared image signal components not more than the threshold value; and an interpolation unit adapted to execute an interpolation process of the visible light image signal on the basis of the infrared image signal components extracted by the extraction unit.

5. The apparatus according to claim 4, further comprising a unit adapted to calculate an average value of the infrared image signal, wherein the predetermined signal value used for replacement by said replacement unit is the average value.

6. A signal processing apparatus for processing a visible light image signal and an infrared image signal obtained by illuminating a transparent document with light beams respectively coming from a visible light source for mainly emitting visible light and an infrared light source for mainly emitting infrared light, and photoelectrically converting optical images of the transparent document, comprising:

a detection unit adapted to detect signal components corresponding to a holder for holding the transparent document from the infrared image signal components;

a removing unit adapted to, when said detection unit detects the signal components corresponding to the holder, removing the signal components from the infrared image signal;

a generation unit adapted to generate a histogram on the basis of the infrared image signal that has undergone the removing process by said removing unit;

a calculation unit adapted to calculate a threshold value on the basis of the histogram generated in the generation unit;

an extraction unit adapted to compare the threshold value calculated by the calculation unit with the infrared image signal that has not undergone the removing process, and extract infrared image signal components not more than the threshold value; and an interpolation unit adapted to execute an interpolation process of the visible light image signal on the basis of the infrared image signal components extracted by said extraction unit.

7. An image reading apparatus capable of reading a transparent document, comprising:

a visible light source that mainly emits visible light;

an infrared light source that mainly emits infrared light;

a photoelectric converter adapted to convert an optical image into an electrical signal;

a detection unit adapted to detect signal components corresponding to a holder for holding the transparent document from an infrared image signal obtained via said photoelectric converter by illuminating a transparent document with light emitted by said infrared light source;

a replacement unit adapted to, when said detection unit detects the signal components corresponding to the holder, replace the signal components of the infrared image signal with a predetermined signal value;

a generation unit adapted to generate a histogram on the basis of the infrared image signal that has undergone the replacement process by said replacement unit;

a calculation unit adapted to calculate a threshold value on the basis of the histogram generated by the generation unit;

an extraction unit adapted to compare the threshold value calculated by said calculation unit with the infrared image signal, and extract infrared image signal components not more than the threshold value; and an interpolation unit adapted to execute an interpolation process of a visible light image signal obtained via said photoelectric converter by illuminating the transparent document with light emitted by said visible light source, on the basis of the infrared image signal components extracted by said extraction unit.

8. The apparatus according to claim 7, further comprising a unit adapted to calculate an average value of the infrared image signal, wherein the predetermined signal value used for replacement by said replacement unit is the average value.

9. An image reading apparatus capable of reading a transparent document, comprising:

a visible light source that mainly emits visible light;

an infrared light source that mainly emits infrared light;

a photoelectric converter adapted to convert an optical image into an electrical signal;

a detection unit adapted to detect signal components corresponding to a holder for holding the transparent document from an infrared image signal obtained via said photoelectric converter by illuminating a transparent document with light emitted by said infrared light source;

a removing unit adapted to, when said detection unit detects the signal components corresponding to the holder, remove the signal components from the infrared image signal;

a generation unit adapted to generate a histogram on the basis of the infrared image signal that has undergone the removing process by said removing unit;

a calculation unit adapted to calculate a threshold value on the basis of the histogram generated by said generation unit;

an extraction unit adapted to compare the threshold value calculated by said calculation unit with the infrared image signal, and extract infrared image signal components not more than the threshold value; and an interpolation unit adapted to execute an interpolation process of a visible light image signal obtained via said photoelectric converter by illuminating the transparent document with light emitted by said visible light source, on the basis of the infrared image signal components extracted in the extraction unit.

* * * * *